United States Patent
Masutani et al.

(10) Patent No.: US 11,953,511 B2
(45) Date of Patent: Apr. 9, 2024

(54) SAMPLE MEASUREMENT SYSTEM AND METHOD OF TRANSPORTING RACKS

(71) Applicant: SYSMEX CORPORATION, Kobe (JP)

(72) Inventors: Kouichi Masutani, Kobe (JP); Yuji Wakamiya, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 834 days.

(21) Appl. No.: 17/034,012

(22) Filed: Sep. 28, 2020

(65) Prior Publication Data

US 2021/0011041 A1   Jan. 14, 2021

Related U.S. Application Data

(63) Continuation of application No. PCT/JP2019/008301, filed on Mar. 4, 2019.

(30) Foreign Application Priority Data

Mar. 29, 2018 (JP) .................................. 2018-065605

(51) Int. Cl.
  *G01N 35/04*  (2006.01)

(52) U.S. Cl.
  CPC ..... *G01N 35/04* (2013.01); *G01N 2035/0403* (2013.01); *G01N 2035/0406* (2013.01);
  (Continued)

(58) Field of Classification Search
  CPC ........... G01N 35/04; G01N 2035/0401; G01N 2035/0412; G01N 35/026
  See application file for complete search history.

(56) References Cited

U.S. PATENT DOCUMENTS

| | | | |
|---|---|---|---|
| 2013/0065797 A1 | 3/2013 | Silbert et al. | |
| 2014/0079527 A1* | 3/2014 | Takai | G01N 35/026 |
| | | | 422/65 |

(Continued)

FOREIGN PATENT DOCUMENTS

| | | |
|---|---|---|
| CN | 102472763 A | 5/2012 |
| CN | 103675304 A | 3/2014 |

(Continued)

OTHER PUBLICATIONS

An English translation of the International Search Report("ISR") of PCT/JP2019/008301 dated May 7, 2019.

(Continued)

*Primary Examiner* — Erika J. Villaluna
(74) *Attorney, Agent, or Firm* — METROLEX IP LAW GROUP, PLLC

(57) ABSTRACT

A sample measurement system and method of transporting of racks are provided that collectively supply the consumables to the sample measurement units. The sample measurement system includes: sample measurement units that perform measurement on samples by using consumables; a setting part in which a user sets consumable racks housing the consumables; a first transport path that supplies the consumable racks set in the setting part to one of the sample measurement units; a collector that is arranged adjacent to the setting part and that collects empty racks that are emptied after being transported to at least one of the sample measurement units; and a second transport path that transports the empty racks to the collector.

19 Claims, 27 Drawing Sheets

(52) U.S. Cl.
CPC ............. *G01N 2035/0412* (2013.01); *G01N 2035/0496* (2013.01)

(56) References Cited

U.S. PATENT DOCUMENTS

| | | | |
|---|---|---|---|
| 2016/0238625 A1 | 8/2016 | Raicu et al. | |
| 2016/0252539 A1 | 9/2016 | Sasaki | |
| 2019/0094250 A1* | 3/2019 | Noda | B65G 60/00 |

FOREIGN PATENT DOCUMENTS

| | | |
|---|---|---|
| CN | 104950116 A | 9/2015 |
| CN | 107407687 A | 11/2017 |
| EP | 3287792 A1 | 2/2018 |
| JP | H04-043962 A | 2/1992 |
| JP | H08-94637 A | 4/1996 |
| JP | 2007-303882 A | 11/2007 |
| JP | 2007-309743 A | 11/2007 |
| JP | 2010-164332 A | 7/2010 |
| JP | 2011-027636 A | 2/2011 |
| JP | 2012-026728 A | 2/2012 |
| JP | 2012-073203 A | 4/2012 |
| JP | 2014-526687 A | 10/2014 |
| WO | 2011/040203 A1 | 4/2011 |
| WO | 2015/093354 A1 | 6/2015 |
| WO | 2017/143182 A2 | 8/2017 |

OTHER PUBLICATIONS

The Office Action dated Aug. 3, 2021 in a counterpart Japanese patent application.
An extended European search report (EESR) dated Dec. 20, 2021 in a counterpart European patent application.
Chinese Office Action dated May 13, 2023 in a counterpart Chinese patent application.
Chinese Office Action dated Dec. 11, 2023 in a counterpart Chinese patent application.

\* cited by examiner

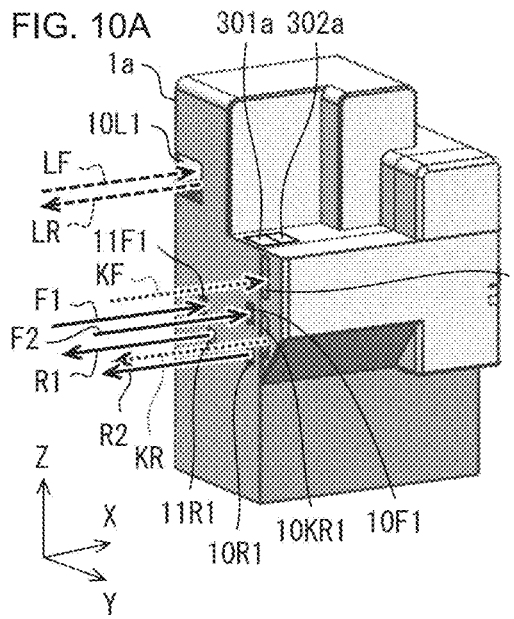
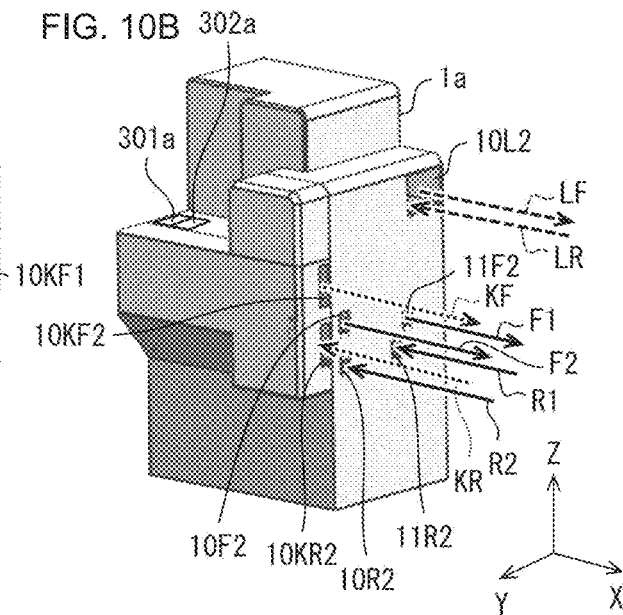
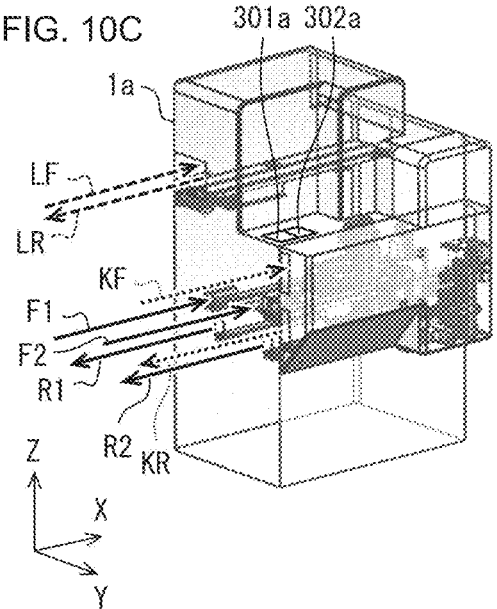
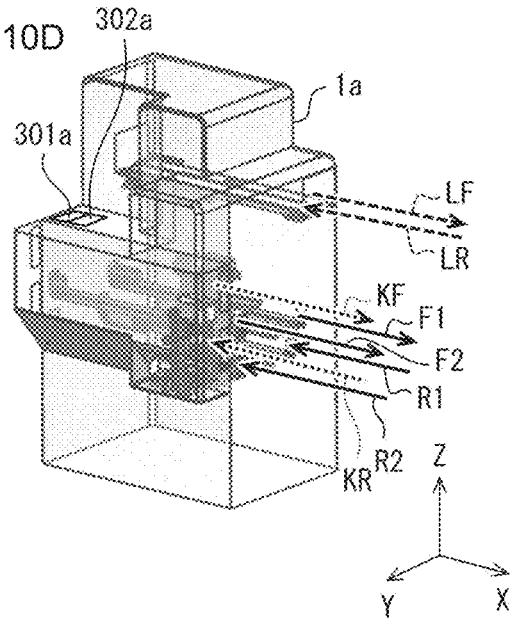

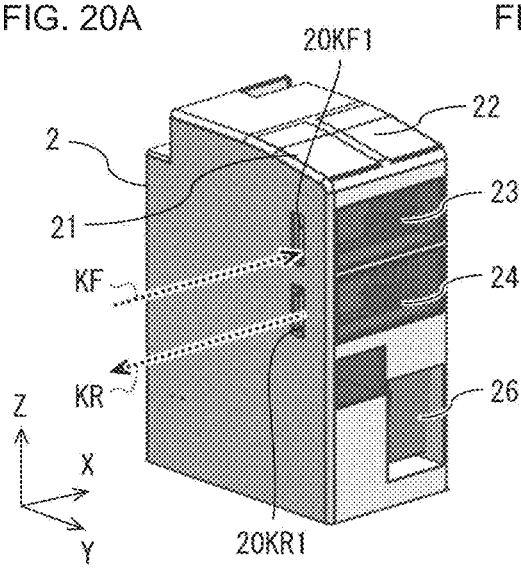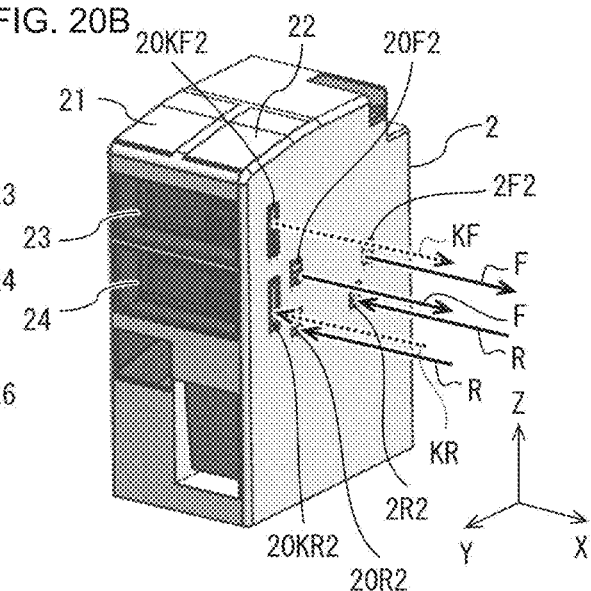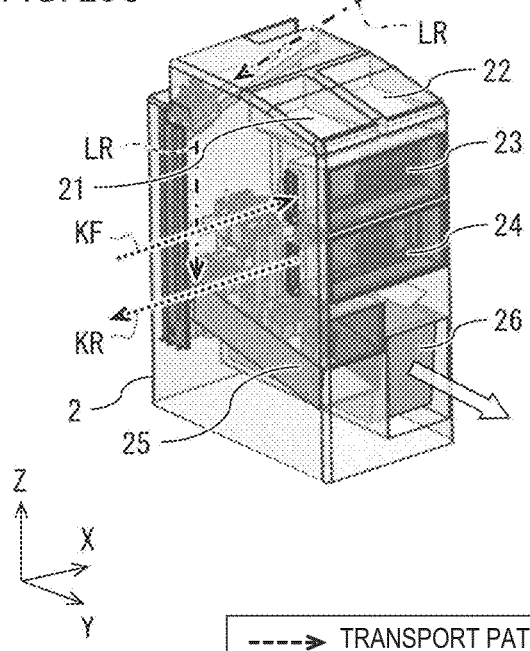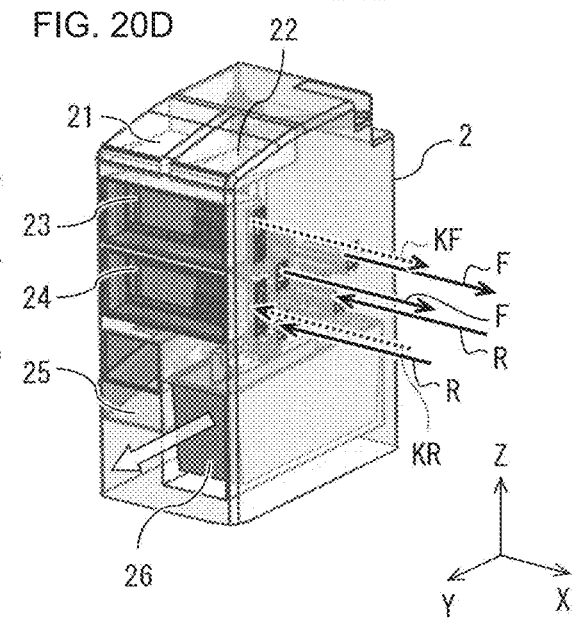

┈┈┈▶ TRANSPORT PATHS
◀┈┈┈ OF SAMPLE

```
┈┈┈> TRANSPORT PATHS
<┈┈┈   OF SAMPLE
```

FIG. 24

| CASE WHERE SAMPLES ARE SORTED INTO THREE CATEGORIES | EXAMPLES OF SORTING RULES |
|---|---|
| MEASURED SAMPLES | SAMPLE RACK HOLDING ONLY SAMPLE CONTAINERS CONTAINING SAMPLES FOR WHICH MEASUREMENT IS NORMALLY COMPLETED |
| REMEASUREMENT SAMPLES | SAMPLE RACK HOLDING AT LEAST ONE SAMPLE CONTAINER CONTAINING SAMPLE WHOSE MEASUREMENT VALUE DEVIATES FROM NORMAL VALUE BY PREDETERMINED CRITERION RANGE OR MORE |
| RETEST REQUIRED SAMPLES | SAMPLE RACK HOLDING AT LEAST ONE SAMPLE CONTAINER CONTAINING SAMPLE WHOSE DEGREE OF DEVIATION OF MEASUREMENT VALUE FROM NORMAL VALUE IS LESS THAN PREDETERMINED CRITERION RANGE BUT FOR WHICH OBTAINING OF SAMPLE FROM SUBJECT AGAIN IS DESIRABLE OR FOR WHICH CHECK WORK BY LABORATORY TECHNICIAN IS TO BE REQUESTED |

-------> TRANSPORT PATH OF
<------- REAGENT CONTAINER

SAMPLE MEASUREMENT SYSTEM AND METHOD OF TRANSPORTING RACKS

CROSS REFERENCE TO RELATED APPLICATIONS

This application is a continuation application of International Application No. PCT/JP2019/008301, filed on Mar. 4, 2019, which claims priority based on the Article 8 of Patent Cooperation Treaty from prior Japanese Patent Application No. 2018-065605, filed on Mar. 29, 2018, the entire contents of which are incorporated herein by reference.

BACKGROUND

The disclosure relates to a sample measurement system including sample measurement units that perform measurement on samples by using common consumables and a method of transporting racks in which racks housing the consumables are supplied to the sample measurement units.

There has been devised a system that automatically performs measurement on samples by using a combination of sample measurement units configured to perform measurement on the samples. An improvement in a sample measurement processing performance is expected by configuring such a system as a system in which the number of sample measurement units configured to perform measurement on samples is increased to a plural number.

However, the improvement in the processing performance of the system achieved by increasing the number of sample measurement units cannot be expected unless reagents to be used in the measurement of the samples, the samples to be measured, and the like are smoothly supplied to the sample measurement units. Accordingly, various techniques relating to how to smoothly supply the samples, the reagents, and the like to the sample measurement units have been devised.

For example, Japanese Patent Application Publication No. 2011-27636 ("Patent Literature 1") discloses an analysis system that automatically supplies reagents to analysis units by using a transport line that transports samples.

A configuration example of the analysis system described in Patent Literature 1 is explained by using FIG. 28. FIG. 28 is a diagram illustrating a configuration example of the analysis system that automatically supplies the reagents to the analysis units by using the transport line that transports the samples.

The analysis system includes two analysis units that analyze the samples. Moreover, the analysis system includes a sample supply unit, a reagent supply unit, a sample collection unit, and a reagent collection unit. The analysis system has a function of automatically supplying reagent containers from the reagent supply unit to the analysis units by using a main transport line for transporting sample containers from the sample supply unit to the analysis units. The sample containers are transported from the sample supply units to the analysis units through the main transport line. The reagent containers are also transported to the analysis units through the main transport line like the sample containers. A retest sample transport line that transports the sample containers in the opposite direction to that of the main transport line is also provided. The used reagents and the samples for which the analysis in the analysis units are completed are transported to the sample collection unit and the reagent collection unit through the main transport line.

When the sample measurement system including the sample measurement units employs the configuration as illustrated in FIG. 28, there are still following points to be improved.

In many cases, the sample measurement system uses consumables such as cuvettes or pipet tips. In order to maintain the processing performance of the sample measurement system, it is desirable to also automatically supply the consumables to the sample measurement units.

Moreover, since the main transport line for transporting the sample containers is used to transport the reagent containers, there is a risk that, when the number of sample measurement units are increased in the sample measurement system, the supply of reagents and samples is delayed and the processing performance of the sample measurement system cannot be maintained.

Generally, the sample measurement units often use consumables that are disposable members such as common cuvettes or pipet tips. Accordingly, if it is possible to achieve a system that automatically supplies the consumables to be used in the units in the same way as the samples and the reagents, the usability of the system is improved. However, the supply frequency of the samples and the reagents differ from the supply frequency of the consumables. Accordingly, when the supplying is performed by using the same transport line, there is a risk that supply of one of the samples, the reagents, and the consumables is delayed and the processing performance of the system cannot be maintained.

One or more aspects aim to achieve a sample measurement system which includes sample measurement units that perform measurement on samples by using consumables and which can collectively supply the consumables to the sample measurement units and transporting of racks in which racks housing the consumables are supplied to the sample measurement units.

SUMMARY

A sample measurement system includes: sample measurement units that perform measurement on samples by using consumables; a setting part in which a user sets consumable racks housing the consumables; a first transport path that supplies the consumable racks set in the setting part to one of the sample measurement units; a collector that is arranged adjacent to the setting part and that collects empty racks that are emptied after being transported to at least one of the sample measurement units; and a second transport path that transports the empty racks to the collector.

A method of transporting racks in which consumable racks housing consumables are supplied to sample measurement units that perform measurement on samples by using the consumables and in which empty racks that are emptied after being transported to at least one of the sample measurement units are collected from the sample measurement unit; the method include: supplying the consumable racks housing the consumables from a setting part to one of the sample measurement units, the setting part being a part in which a user sets the consumable racks; collecting the empty racks that are emptied after being transported to at least one of the sample measurement units into a collector arranged adjacent to the setting part; and transporting the empty racks to the collector.

BRIEF DESCRIPTION OF DRAWINGS

FIGS. 10A to 10D are perspective views illustrating a schematic configuration of the sample measurement unit.

FIGS. 20A to 20D are perspective views illustrating a schematic configuration of a consumable setting unit.

FIG. 24 is a diagram illustrating an example of rules for sorting samples depending on measurement results.

DETAILED DESCRIPTION

Figure 1:
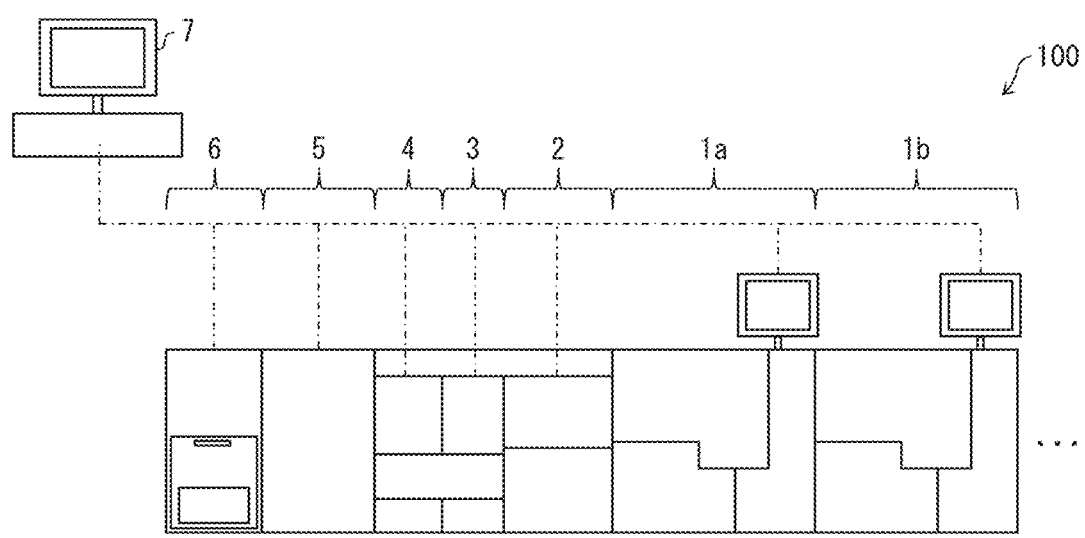
FIG. 1 is an exterior diagram illustrating an example of a configuration of a sample measurement system.

A sample measurement system (100) according to an aspect includes: sample measurement units (1a, 1b) that perform measurement on samples by using consumables; a setting part (consumable setting unit 2, consumable rack setting part 21) in which a user sets consumable racks housing the consumables; a first transport path (F) that supplies the consumable racks set in the setting part (consumable setting unit 2, consumable rack setting part 21) to one of the sample measurement units (1a, 1b); a collector (consumable rack collector 22) that is arranged adjacent to the setting part (consumable setting unit 2, consumable rack setting part 21) and that collects empty racks that are emptied after being transported to at least one of the sample measurement units (1a, 1b); and a second transport path (R) that transports the empty racks to the collector (consumable rack collector 22).

According to the aforementioned configuration, the sample measurement system (100) transports the consumable racks housing the consumables from the setting part (consumable setting unit 2, consumable rack setting part 21) to the sample measurement units (1a, 1b) by using the first transport path (F), transports the empty racks that are emptied after being transported to at least one of the sample measurement units (1a, 1b) by using the second transport path (R), and collects the empty racks into the collector (consumable rack collector 22) adjacent to the setting part (consumable setting unit 2, consumable rack setting part 21).

It may be preferable that the consumables are thereby collectively supplied to and collected from the sample measurement units (1a, 1b) included in the sample measurement system (100). Accordingly, a user such as a laboratory technician who uses the sample measurement system (100) does not have to supply the consumables to each of the sample measurement units (1a, 1b) and collect the empty racks from each of the sample measurement units (1a, 1b). Thus, the usability of the sample measurement system (100) can be improved.

It may be preferable that the sample measurement system (100) is configured such that the first transport path (F) and the second transport path (R) are provided in cases of the sample measurement units (1a, 1b).

It may preferable that the sample measurement system (100) is thereby configured to have a small dimension in the horizontal direction even when the first transport path (F) and the second transport path (R) are provided.

It may be preferable that the sample measurement system (100) is configured to further include a consumable collection path (RR) that collects the consumables, used after being transported to at least one of the sample measurement units (1a, 1b), into the consumable setting unit (2).

It may be preferable that the setting part (consumable setting unit 2) include a consumable accumulation part (26) in which the consumables transported by using the consumable collection path (RR) are accumulated.

The consumables used in one of the sample measurement units (1a, 1b) are thereby accumulated in the setting part (consumable setting unit 2). Accordingly, the user such as the laboratory technician who uses the sample measurement system (100) only needs to take out the used consumables from the setting part (consumable setting unit 2) and dispose them.

It may be preferable that the sample measurement system (100) is configured such that the sample measurement units (1a, 1b) include consumable storage portions (consumable rack storage portions 182a, 182b) that store the consumables supplied from the first transport path (F), and when supply of the consumables from the first transport path (F) to the sample measurement units (1a, 1b) stops, the sample measurement units (1a, 1b) perform measurement on the samples by using the consumables stored in the consumable storage portions (consumable rack storage portions 182a, 182b).

When there are many samples to be measured, it may be preferable that a sample measurement system (100) including many sample measurement units (1) is introduced. However, since an increase in the number of sample measurement units (1) leads to an increase in the length of the first transport path (F), a frequency of failures occurring in the first transport path (F) may increase.

According to one or more aforementioned configurations, even if the supply of the consumables from the first transport path (F) stops, the sample measurement units (1a, 1b) perform measurement by using the consumables housed in the consumable racks stored in the consumable storage portions (consumable rack storage portions 182a, 182b).

A sample measurement system (100) can thereby continue the measurement without stopping it even if the supply of the consumables from the first transport path (F) to the sample measurement units (1a, 1b) stops. Accordingly, the measurement can continue even in a state where no consumables are supplied from the consumable setting unit (2) and the downtime of the sample measurement system (100) can be reduced.

It may be preferable that the sample measurement system (100) further includes an information management device (7) that is communicably connected to each of the setting part (consumable setting unit 2) and the sample measurement units (1a, 1b) and that manages a supply state of the consumables from the first transport path (F) to each of the sample measurement units (1a, 1b) and be configured such that, when the consumables are not supplied from the setting part (consumable setting unit 2) to at least one of the sample measurement units (1a, 1b), the information management device (7) causes the consumable racks to be supplied to the sample measurement unit (1a, 1b) to which the consumables are not supplied.

A sample measurement system (100) thereby does not have to immediately stop the measurement and can continue the measurement even if the supply of the consumables from the first transport path (F) to the sample measurement units (1a, 1b) stops.

It may be preferable that the information management device (7) is configured to give a transport instruction to the setting part (consumable setting unit 2) such that the consumables are supplied to each of the sample measurement units (1a, 1b).

The consumables can be thereby surely transported from the setting part (consumable setting unit 2) to each of the sample measurement units (1a, 1b).

It may be preferable that the sample measurement system (100) is configured such that rack identification information is assigned to each of the consumable racks, the setting part (consumable setting unit 2) sends the information management device (7) the rack identification information of the consumable rack transported to the first transport path (F) in response to the transport instruction, and the information management device (7) determines whether the consumable rack to which the received rack identification information is assigned is supplied to the sample measurement unit (1a, 1b).

The information management device (7) can thereby determine that the consumables are supplied from the setting part (consumable setting unit 2) to each of the sample measurement units (1a, 1b).

It may be preferable that the consumables are disposable parts.

More specifically, the consumables may be any of pipet tips, cuvettes, reagent containers, petri dishes, well plates, glass slides, glass substrates, and syringe needles.

One or more embodiments provides a method of transporting racks in which consumable racks housing consumables are supplied to sample measurement units (1a, 1b) that perform measurement on samples by using the consumables and in which empty racks that are emptied after being transported to at least one of the sample measurement units (1a, 1b) are collected from the sample measurement unit (1a, 1b); the method may include: supplying the consumable racks housing the consumables from a setting part (consumable rack setting part 21) to one of the sample measurement units (1a, 1b), the setting part being a part in which a user sets the consumable racks; collecting the empty racks that are emptied after being transported to at least one of the sample measurement units (1a, 1b) into a collector (consumable rack collector 22) arranged adjacent to the setting part (consumable rack setting part 21); and transporting the empty racks to the collector (consumable rack collector 22).

According to the aforementioned configuration, the consumables are transported to each of the sample measurement units (1a, 1b) and the empty racks that are emptied after being transported to at least one of the sample measurement units (1a, 1b) are collected from the sample measurement unit (1a, 1b).

The consumables can be thereby collectively supplied to the sample measurement units (1a, 1b) included in the sample measurement system (100) and the empty racks can be collectively collected from the sample measurement units (1a, 1b). Accordingly, the user such as the laboratory technician who uses the sample measurement system (100) does not have to supply the consumables to each of the sample measurement units (1a, 1b) and collect the empty racks from each of the sample measurement units (1a, 1b). Thus, the usability of the sample measurement system (100) can be improved.

According to one or more embodiments, in a sample measurement system including sample measurement units that perform measurement on samples by using consumables, consumables can be collectively supplied to each of the sample measurement units.

(Outline of Sample Measurement System 100)

A sample measurement system 100 is, for example, a system that automatically performs measurement relating to tests, analysis, and the like of samples and is formed by combining functional units. Note that, in this specification, the "measurement" performed by the sample measurement system 100 may be any measurement relating to tests, analysis, and the like of samples. Specifically, the measurement performed by the sample measurement system 100 may include, for example, steps such as, for example, heating, cooling, culturing, shaking, dispensing, mixing, separation, collection, application, and spotting, although not limited to these.

Moreover, in this specification, the "samples" are intended to be any objects collected from objects being targets of tests, analysis, and the like. For example, when the sample measurement system 100 is a system that performs measurement relating tests given as test items in determination of a health condition of a living body (for example, patient) and in diagnosis criteria relating to a certain disease, the samples may be blood, urine, tissues, bones, expired air, and the like. When the sample measurement system 100 is a system that performs tests and analysis relating to environmental assessment and the like, the samples may be water, soil, air, plants, microorganisms, and the like collected at a target location.

Note that, as an example, description is given below of an embodiment in the case where the sample measurement system 100 is an immunoassay system that performs measurement and analysis relating to test items for an immune system. Diseases for which the test items for the immune system are included in the diagnosis criteria include hepatitis B, hepatitis C, tumors, and thyroid hormone abnormalities, although not limited to these.

For example, there are known various molecules whose abundance in blood varies depending on presence or absence of hepatitis B, hepatitis C, tumors, and thyroid hormone abnormalities. Such molecules are generally referred to as "molecular markers." The diagnosis criteria for quick and accurate diagnosis of presence or absence of hepatitis B, hepatitis C, tumors, thyroid hormone abnormalities, and the like require measurement of contents, concentration, and the like of the molecular markers in the blood collected from a subject. The measurement relating to the test items for immune system is measurement of uniquely detecting and quantifying specific molecular markers in blood at high-sensitivity by utilizing antigen-antibody reaction in which the specific molecular markers are target molecules. The sample measurement system 100 is a system that has functions of performing measurement relating to these test items for immune system and evaluating and analyzing measurement results according to the diagnosis criteria.

(Schematic Configuration of Sample Measurement System 100)

Next, the schematic configuration of the sample measurement system 100 is described by using FIG. 1. FIG. 1 is a diagram illustrating an example of a configuration of the sample measurement system 100 according to the embodiment. The sample measurement system 100 includes sample measurement units that are functional units typically having a function of performing the aforementioned measurement. For example, the sample measurement system 100 illustrated in FIG. 1 includes sample measurement units 1a, 1b, a consumable setting unit 2 (setting part, rack setting unit), a sample sorting unit 3, a sample setting unit 4 (rack setting unit), a reagent container holding unit 5, a cleaning liquid holding unit 6, and an information management device 7.

The information management device 7 and each of the functional units of the sample measurement system 100 are communicably connected to each other as illustrated by one-dot chain lines in FIG. 1 and the information management device 7 integrally controls operations of the functional units included in the sample measurement system 100. Moreover, the information management device 7 may have a function of accumulating results measured in the sample measurement units 1a, 1b and performing various types of analysis based on the measurement results.

<Expandability of Sample Measurement System 100>

In hospitals, test institutions, and the like that perform tests and diagnosis for many subjects, measurement relating to wide variety of test items needs to be performed many times daily. The test institutions are institutions that perform measurement and analysis relating to test items specified by medical organizations on samples for which tests are requested by the medical organizations and provide the test results to the medical organizations. In such a case, a processing performance of the sample measurement system 100 can be easily improved by increasing the number of sample measurement units that perform measurement of the samples. However, the processing performance of the sample measurement system 100 cannot be improved unless the samples to be measured and reagents and consumables to be used in the measurement are stably supplied to the sample measurement units 1a, 1b without shortage. Moreover, a problem of whether a space for installing the sample measurement system 100 is enough or not needs to be solved to additionally install a sample measurement unit.

There may also be a case where the diagnoses criteria are revised. For example, when execution of an immune system test for a molecular marker not included in the conventional diagnoses criteria becomes necessary, the hospitals and test institutions may introduce a measurement apparatus having a function of performing measurement for the new molecular marker, in addition to the sample measurement system 100. However, samples such as blood of subjects need to be collected and distributed to sample containers applicable to the sample measurement system 100 and sample containers applicable to the newly introduced measurement apparatus. Moreover, since a work routine varies between the sample measurement system 100 and the newly introduced measurement apparatus, work is cumbersome. Furthermore, problems such as a problem of cost of newly and additionally introducing an expensive measurement apparatus and a problem of space for installing the new measurement apparatus need to be solved.

The functional units, including the sample measurement units 1a, 1b, of the sample measurement system 100 are configured to have small dimensions in the horizontal direction. This suppresses an increase in an installation area of the sample measurement system 100. Moreover, the sample measurement units 1a, 1b, the sample sorting unit 3, the sample setting unit 4, and the like can be additionally installed in the sample measurement system 100 as necessary and the sample measurement system 100 has expandability. The processing performance of the sample measurement system 100 can be easily improved by adding desired functional units such as the sample measurement units 1a, 1b to the sample measurement system 100. For example, the processing performance of the sample measurement system 100 can be improved by additionally installing sample measurement units 1c, 1d and the like in the sample measurement system 100 illustrated in FIG. 1.

(Sample Containers C3, Sample Rack C30, Reagent Containers, Consumables, Consumable Racks C10, C20)

Forms and structures of consumables, sample containers C3, reagent containers, and the like used in the sample measurement system 100 are common to functional units. Specifically, even when the sample measurement units 1c, 1d and the like are additionally installed in the sample measurement system 100 illustrated in FIG. 1, the consumables, the sample containers C3, the reagent containers, and the like used before the additional installation can be used without being changed.

Generally, measurement relating to a test of an immune system is often performed by using consumables and consumables are used also in the sample measurement units 1a, 1b. Note that, in this specification, the "consumables" refer to parts (so-called disposable parts) intended to be replaced and disposed after being used a predetermined number of times (for example, once). The consumables may be, for example, pipet tips C2, cuvettes C1, reagent containers, petri dishes, well plates (the number of wells is, for example, 48, 96, 384, or the like), glass slides, glass substrates, and needles including syringe needles and the like, although not limited to these. The cuvettes C1 are tubes that may be used as reaction containers in which samples dispensed from the sample containers C3 and a reagent dispensed from the reagent container are mixed to cause antigen-antibody reaction or the like or are tubes that may be subjected to spectroscopic measurement such as fluorescent detection in the sample measurement units 1a, 1b. Consumable racks C10, C20 may be reused or disposed after the use like the consumables. Description is given below of the case where the consumable racks C10, C20 are reused as an example.

<<Sample Containers C3>>

Figure 2A:
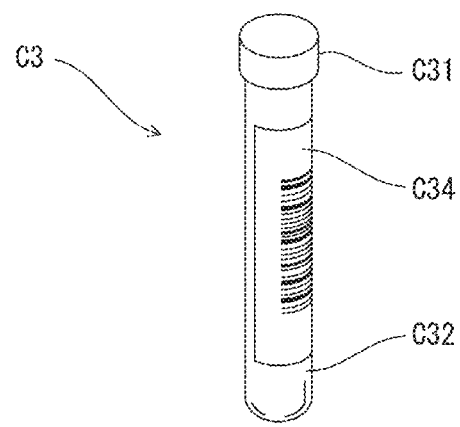
FIG. 2A is a perspective view illustrating a configuration example of a sample container.
Figure 2B:
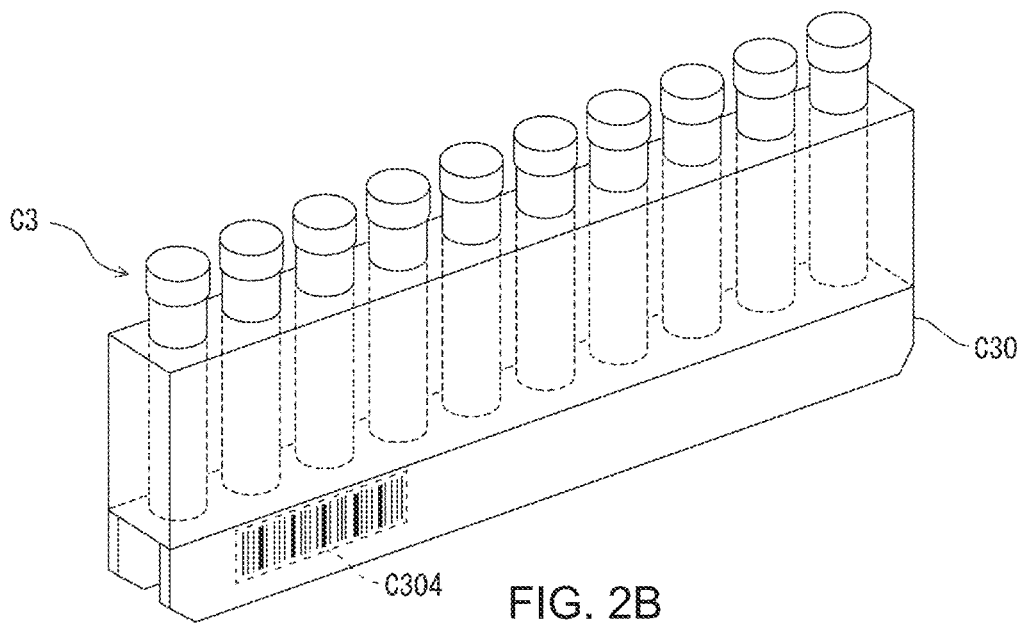
FIG. 2B is a perspective view illustrating a configuration example of a sample rack housing a sample containers.

A configuration of the sample containers C3 applicable to the sample measurement system 100 is described with reference to FIGS. 2A and 2B. As illustrated in FIG. 2A, each sample container C3 may include a lid portion C31, a body portion C32, and a barcode label C34. Note that, in the sample container C3, the lid portion C31 is not an essential configuration and the sample container C3 only needs to include the body portion C32 and the barcode label C34. The body portion C32 is a blood collection tube made of glass or synthetic resin that is translucent and a sample is contained in the body portion C32. The lid portion C31 tightly seals an opening at an upper end of the body portion C32 containing the sample. The lid portion C31 is made of plastic. The barcode label C34 is attached to a side surface of the body portion C32. A barcode indicating a sample ID is printed in the barcode label C34. The sample ID is information that allows the sample contained in each sample container C3 to be individually identified.

<<Sample Rack C30>>

Next, a configuration of sample racks C30 is described with reference to FIG. 2B. Each sample rack C30 can hold sample containers C3 and, for example, as illustrated in FIG. 2B, can hold up to a predetermined number of (for example, ten) sample containers C3. A barcode label C304 is provided on an outer side surface of the sample rack C30. A barcode indicating a sample rack ID is printed in the barcode label C304. The sample rack ID is information that allows each sample rack C30 to be individually identified. Note that the position of the barcode label C304 is not limited to the position illustrated in FIG. 2B. For example, the position of the barcode label C304 and the orientation of the barcode may be set to such position and orientation that a barcode reader configured to read the barcode labels C34 of the sample containers C3 can read the barcode label C304.

<<Reagent Containers>>

In the sample measurement units 1a, 1b, reagents are used in the measurement performed on the samples. The reagent containers are containers containing the reagents. Each reagent container generally includes a plug body, a body portion, and a lid portion. The body portion is a bottle or a jar made of glass or synthetic resin that is translucent and the reagent is contained in the body portion. The plug body seals an opening at an upper end of the body portion containing the reagent. The plug body may be made of elastic synthetic resin or the like. A recess portion may be formed on an upper surface of the plug body. The lid portion is made of plastic and covers the plug body attached to the body portion from above. A screw thread to be fitted to a screw thread provided on the outer side of the body portion may be provided on the inner side of the lid portion. A penetration hole may be formed in the lid portion. The recess portion in the plug body and the hole provided in the lid portion are provided to allow a front end of a tube or a nozzle for aspirating the reagent from the reagent container in the sample measurement units 1a, 1b to enter the reagent container. A barcode label may be attached to a side surface of the body portion. A barcode indicating a reagent ID is printed in this barcode label. The reagent ID may include information indicating the type of the reagent, the manufacturing number, the manufacturing date, and the like.

<<Barcode Reader>>

The functional units such as the sample measurement units 1a, 1b, the sample setting unit 4, and the sample sorting unit 3 that have a function of performing at least one of setting, discharging, transporting, and loading of the sample containers and the sample racks C3 each include a barcode reader that reads the barcode labels C34 on the sample containers and the barcode labels C304 on the sample racks. A unique reader ID is assigned to each barcode reader and each reader transmits the read sample IDs and the sample rack IDs to the information management device 7 together with the reader ID of itself. The information management device 7 may obtain the reader IDs and the combinations of the read sample IDs and sample rack IDs at any time. The information management device 7 can recognize and manage actions such as, for example, an action in which the sample rack C30 to be transported from the sample setting unit 4 to the sample measurement unit 1a is transported from the sample setting unit 4 and an action in which this sample rack C30 is supplied to the sample measurement unit 1a, in real time, by obtaining the reader IDs and information on the barcode label C304 read by the barcode readers. The information management device 7 can thereby surely supply the sample containers C3, transported from the sample setting unit 4, to the sample measurement units 1a, 1b to which the sample containers C30 are to be supplied.

Similarly, the information management device 7 obtains the reader IDs and information on the barcode labels of the reagent containers read by the barcode readers. The information management device 7 thereby recognizes and manages actions such as an action in which the reagent containers to be transported from the reagent container holding unit 5 to the sample measurement units 1a, 1b are transported from the reagent container holding unit 5 and an action in which these reagent containers are supplied to the sample measurement units 1a, 1b, in real time.

<<Consumables: Cuvettes C1 and Pipet Tips C2>>

Examples of the consumables used in the sample measurement units 1a, 1b are described with reference to FIGS. 3A to 3D. FIGS. 3A to 3D are views illustrating examples of the cuvette C1 used in the measurement in the sample measurement units 1a, 1b, the consumable rack C10 that holds the cuvettes C1, the pipet tip C2, and the consumable rack C20 that holds the pipet tips C2.

Figure 3A:
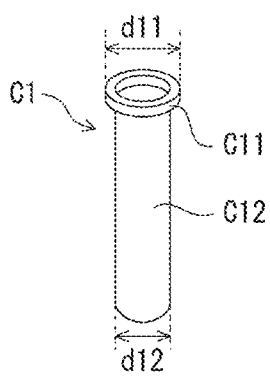
FIGS. 3A to 3D are views illustrating examples of a cuvette used in measurement in the sample measurement units, a consumable rack holding cuvettes, a pipet tip, and a consumable rack holding pipet tips.
Figure 3B:
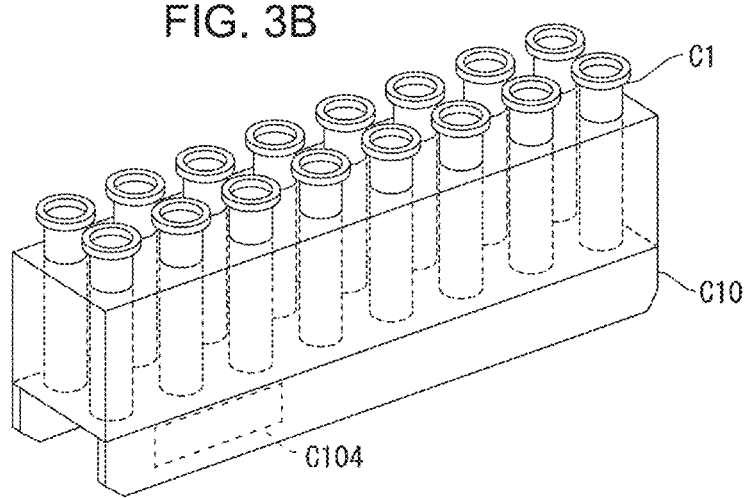
Figure 3C:
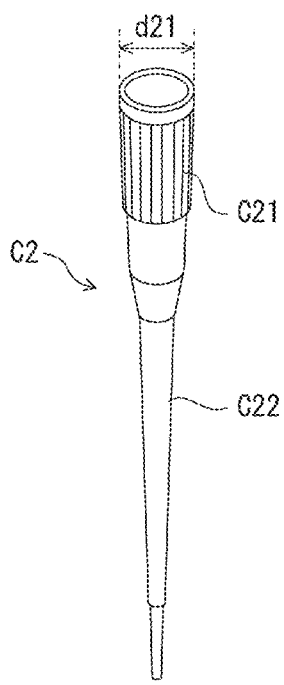

As illustrated in FIG. 3A, each cuvette C1 is formed of a flange portion C11 having a diameter of d11 and a body portion C12 having a diameter of d12 smaller than the diameter d11. The cuvette C1 is used to cause the sample and the reagent to react with each other and is disposed after the measurement of the sample. Meanwhile, as illustrated in FIG. 3C, each pipet tip C2 is formed of an attachment portion C21 having a diameter of d21 smaller than the diameter d11 and a body portion C22 having a diameter smaller than the diameter d21. The pipet tip C2 is used to aspirate and discharge the sample and is disposed every time the sample is aspirated and discharged. In other words, the cuvette C1 and the pipet tip C2 are disposable members and are consumables that are disposed to prevent mixing of samples.

<<Consumable Racks C10, C20>>

Figure 3D:
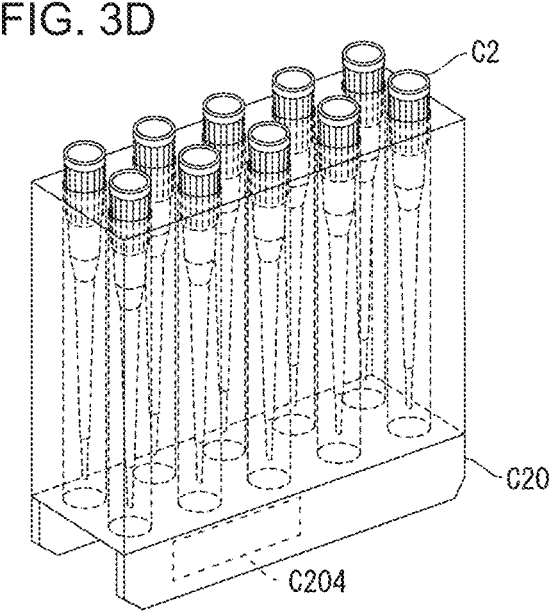

Next, the consumable racks C10, C20 are described. The consumable rack C10 is a rack that can hold the cuvettes C1 and the consumable rack C20 is a rack that can hold the pipet tips C2. FIG. 3B illustrates an example of the consumable rack C10 that holds 16 cuvettes C1 and FIG. 3D illustrates an example of the consumable rack C20 that holds ten pipet tips C2. When the dimensions of the consumable racks C10, C20 are large, the width of transport paths that transport these racks needs to be set large. Accordingly, the consumable racks C10, C20 may be configured such that the dimension of the sample measurement system 100 in the horizontal direction does not become large. For example, the configuration may be such that the number of consumables that can be held by each of the consumable racks C10, C20 is limited to about 10 to 30 and, instead, a supply frequency from the consumable setting unit 2 to the sample measurement units 1a, 1b is increased.

The consumable racks C10, C20 include RFID tags C104 and C204 that store rack identification information assigned to the consumables. The RFID tags C104 and C204 may be provided respectively on side surfaces of the consumable racks C10, C20 as illustrated in FIGS. 3B and 3D.

Note that a set of cuvettes C1 and a set of the pipet tips C2 are each generally sold with a predetermined number (for example, 500) of cuvettes C1 or pipet tips C2 housed in a bag or with a predetermined number of cuvettes C1 or pipet tips C2 housed and arranged in a predetermined container in advance. The configuration may be such that the container housing the predetermined number of cuvettes C1 or pipet tips C2 on the market can be used as it is as the consumable rack C10, C20 of the sample measurement system 100.

<<RFID Reader Writer>>

The information management device 7 also manages supplying of the consumable racks C10, C20 from the consumable setting unit 2 to the sample measurement units 1a, 1b like the transport of the sample rack C30. The consumable setting unit 2 obtains a transport instruction including information on which consumable rack is to be supplied to each of the sample measurement units 1a, 1b, from the information management device 7. The consumable setting unit 2 includes a RFID reader writer. The RFID reader writer writes identification information such as unit IDs, assigned to the sample measurement units 1a, 1b to which the consumables are to be supplied, into the RFID tags C104 and C204 of the consumable racks C10, C20. Each of the sample measurement units 1a, 1b receives the consumable racks C10, C20 having the RFID tags in which the unit ID of itself is written. For example, the RFID reader writer is provided in each of a consumable rack setting part 21 and a consumable rack collector 22. When the consumable racks (empty racks) C10, C20 emptied after being transported to at least one of the sample measurement units 1a, 1b are collected into the consumable rack collector 22, the RFID reader writer of the consumable rack collector 22 erases the information written in the RFID tags of the collected consumable racks C10, C20. Using the RFID tags as described above allows transport of the consumable racks C10, C20 while specifying the sample measurement units 1a, 1b to which the consumable racks C10, C20 need to be supplied. For example, the consumable racks C10, C20 emptied after being transported to the sample measurement unit 1a can be then reused as the consumable racks C10, C20 used to supply the consumables to the sample measurement unit 1b.

(Transport Paths Included in Sample Measurement System 100)

Figure 4A:
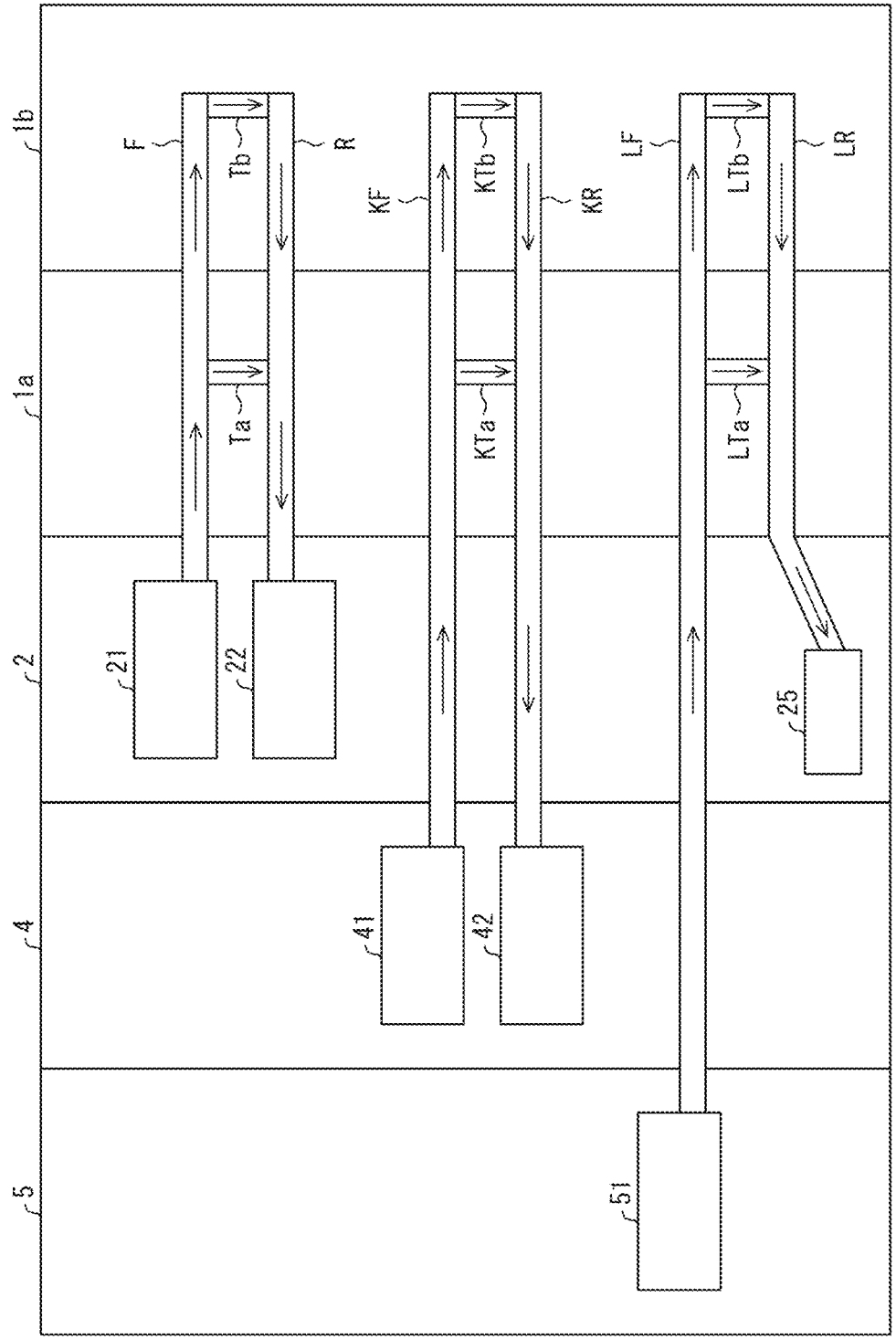
FIG. 4A is a schematic diagram illustrating an outline of transport paths included in a sample measurement system.

Next, transport paths included in the sample measurement system 100 are described by using FIG. 4A. FIG. 4A is an illustrative diagram illustrating an outline of the transport paths included in the sample measurement system 100. Note that the sample sorting unit 3 is omitted in FIG. 4A. The sample sorting unit 3 is not a functional unit essential for the configuration of the sample measurement system 100.

As illustrated in FIG. 4A, the consumable setting unit 2 includes the consumable rack setting part 21 (setting part) and the consumable rack collector 22 (collector). The consumable setting unit 2 holds the consumables. A user such as a laboratory technician sets the consumable racks C10, C20, housing the consumables to be used in the measurement of the samples in the sample measurement units 1a, 1b, in the consumable rack setting part 21. The consumable racks C10, C20 set in the consumable rack setting part 21 are transported in a first direction by a first transport path F (first transporting step) and are supplied to the sample measurement units 1a, 1b (supplying step). Note that the consumable setting unit 2 may have a mechanism that automatically houses the consumables supplied by the user into the empty consumable racks C10, C20 (empty racks). In this case, it is only necessary to set the empty consumable racks C10, C20 housing no consumables in the consumable rack setting part 21. Here, the consumables may be, for example, the cuvettes C1 and/or the pipet tips C2. The cuvettes C1 and/or the pipet tips C2 are disposable members that are replaced after being used in the sample measurement units 1a, 1b.

Although FIG. 4A illustrates an example in which the consumable setting unit 2 includes the consumable rack setting part 21 and the consumable rack collector 22, the present invention is not limited to this configuration. Another example of the consumable rack collector 22 included in the sample measurement system 100 is described by using FIG. 4B. For example, as illustrated in part (a) of FIG. 4B, the configuration may be such that the consumable rack collector 22 is provided as a body separate from the consumable setting unit 2. Specifically, a functional unit (for example, "consumable rack collection unit") that includes the consumable rack collector 22 and that is different from the consumable setting unit 2 may be formed and arranged, for example, adjacent to the consumable setting unit 2. Alternatively, as illustrated in part (b) of FIG. 4B, a shelf or a box for collecting the consumable racks may be provided near the consumable setting unit 2 to be used as the consumable rack collector 22.

The first transport path F extends from the consumable rack setting part 21 and passes through insides of cases of the sample measurement units 1a, 1b. In other words, the first transport path F is provided in the cases of the sample measurement units 1a, 1b. The first transport path F is a path for transporting the consumables from the consumable setting unit 2 to at least one of the sample measurement units 1a, 1b. The consumable racks C10, C20 installed in the consumable rack setting part 21 are used to supply the consumables to the sample measurement units 1a, 1b through the first transport path F and are members that may be repeatedly used.

A second transport path R passes through at least one of the sample measurement units 1a, 1b and is a path for transporting the consumable racks C10, C20, emptied as a result of usage of the consumables, from the sample measurement units 1a, 1b in a second direction different from the aforementioned first direction (second transporting step). The second transport path R extends from the consumable rack collector 22 and passes through the insides of the cases of the sample measurement units 1a, 1b. In other words, the second transport path R is provided in the cases of the sample measurement units 1a, 1b. The second transport path R is a path for transporting the consumable racks C10, C20, emptied as a result of usage of the consumables in the sample measurement units 1a, 1b, to the consumable setting unit 2. The second transport path R collects the empty consumable racks C10, C20 from the sample measurement units 1a, 1b into the consumable rack collector 22 of the consumable setting unit 2 (collecting step).

Note that the consumable rack collector 22 is installed adjacent to the consumable rack setting part 21. Alternatively, when the first transport path F and the second transport path R are provided at different positions (levels) in the height direction, the consumable rack setting part 21 and the consumable rack collector 22 may also be provided at different positions in the height direction. In this case, the consumable rack collector 22 may be installed adjacent to the consumable rack setting part 21 in the height direction. The consumable rack collector 22 may be typically provided above the consumable rack setting part 21. This configuration allows the user such as the laboratory technician to perform both of supplying of the consumables to all of the sample measurement units 1a, 1b included in the sample measurement system 100 and collecting of the empty consumable racks C10, C20 while staying near the consumable setting unit 2. Accordingly, the usability of the sample measurement system 100 can be improved.

A consumable transfer path Ta (transfer path) is provided in the sample measurement unit 1a and is provided between the first transport path F and the second transport path R. After the consumables housed in the consumable racks C10, C20 transported by the first transport path F are used in the sample measurement unit 1a, the consumable transfer path Ta transfers the empty consumable racks C10, C20 to the second transport path R. The consumable transfer path Ta is a path for transferring the consumable racks C10, C20, being empty after the supplying of the consumables in the supplying step, to the second transport path R provided at the position different from the first transport path F in the height direction (lifting-lowering step).

A consumable transfer path Tb is provided in the sample measurement unit 1b and is provided between the first transport path F and the second transport path R. After the consumables housed in the consumable racks C10, C20 transported by the first transport path F are used in the sample measurement unit 1b, the consumable transfer path Tb transfers the empty consumable racks C10, C20 to the second transport path R. The consumable transfer path Tb is a path for transferring the consumable racks C10, C20, being empty after the supplying of the consumables in the supplying step, to the second transport path R provided at the position different from the first transport path F in the height direction (lifting-lowering step).

Note that the first transport path F and the second transport path R are desirably provided in different two stages of an upper stage and a lower stage, respectively, to suppress an increase in the dimension of the sample measurement system 100 in the horizontal direction. In other words, the height of a placing surface of the first transport path F may be different from the height of a placing surface of the second transport path R. Typically, the first transport path F may be provided substantially directly below the second transport path R or the first transport path F may be provided substantially directly above the second transport path R.

The empty consumable racks C10, C20 the consumables in which are used in the sample measurement units 1a, 1b are held in the consumable rack collector 22. The user may take out the consumable racks C10, C20 held in the consumable rack collector 22, house the consumables in the consumable racks C10, C20, and then set the consumable racks C10, C20 in the consumable rack setting part 21. Alternatively, the consumable rack setting part 21 may have a function of automatically housing the consumables in the consumable racks C10, C20.

The sample setting unit 4 includes a sample rack setting part 41 and a sample rack collector 42. The sample rack setting part 41 receives the sample containers C3 housing the samples to be subjected to the measurement in the sample measurement units 1a, 1b and discharges these sample containers C3 to a sample transport path KF (first transport path). Note that the sample rack setting part 41 may have a configuration of collectively discharging multiple sample containers C3 to the sample transport path KF by using the sample rack C30 holding the sample containers C3. The sample rack setting part 41 functions as an accumulation part of the samples that is provided in the sample transport path KF.

The sample transport path KF extends from the sample rack setting part 41 and passes through the insides of a case of the consumable setting unit 2 and protection covers provided in the sample measurement units 1a, 1b. The protection covers are provided on the sides of the cases of the sample measurement units 1a, 1b where operations from the user are received. The sample transport path KF is a path for transporting the sample racks C30 from the sample setting unit 4 to at least one of the sample measurement units 1a, 1b in the first direction. The sample racks C30 transported from the sample rack setting part 41 are supplied to the sample measurement units 1a, 1b through the sample transport path KF (supplying step).

A sample collection path KR (second transport path, sample rack collection path) extends from the sample rack collector 42 and passes through the insides of the cases of the consumable setting unit 2 and the sample measurement units 1a, 1b. The sample collection path KR is a path for transporting the sample racks C30 holding the sample containers C3 containing the samples measured in any of the sample measurement units 1a, 1b to the sample setting unit 4 in the second direction different from the aforementioned first direction. Specifically, the sample collection path KR transports the sample containers or the sample racks to the sample rack collector 42 of the sample setting unit 4.

In this example, the sample transport path KF and the sample collection path KR are provided at different positions (levels) in the height direction. The sample rack setting part 41 and the sample rack collector 42 may be accordingly also provided at different positions in the height direction. In this case, the sample rack collector 42 may be installed adjacent to the sample rack setting part 41 in the height direction.

A sample transfer path KTa (transfer path) is provided in the sample measurement unit 1a and is provided between the sample transport path KF and the sample collection path KR. The sample transfer path KTa is used when the sample racks C30 transported by the sample transport path KF are to be transferred into the case of the sample measurement unit 1a and when the sample racks C30 holding the sample containers C3 housing the samples measured in the sample measurement unit 1a are to be transferred to the sample collection path KR. The sample transfer path KTa is a path for transferring the sample racks C30 supplied in the supplying step to the sample collection path KR provided at the position different from the sample transport path KF in the height direction (lifting-lowering step).

A sample transfer path KTb (transfer path) is provided in the sample measurement unit 1b and is provided between the sample transport path KF and the sample collection path KR. The sample transfer path KTb is used when the sample racks C30 transported by the sample transport path KF are to be transferred into the case of the sample measurement unit 1b and when the sample racks C30 holding the sample containers C3 housing the samples measured in the sample measurement unit 1b are to be transferred to the sample collection path KR. The sample transfer path KTb is a path for transferring the sample racks C30 supplied in the supplying step to the sample collection path KR provided at the position different from the sample transport path KF in the height direction (lifting-lowering step).

The sample rack collector 42 collects the sample racks C30 holding the sample containers C3 containing the samples measured in the sample measurement units 1a, 1b and holds the collected sample racks C30. The user can take out the sample containers C3 or the sample racks C30 collected by the sample rack collector 42, from the sample rack collector 42.

Moreover, the sample racks C30 may remain inside the sample measurement unit 1a or the sample measurement unit 1b. Specifically, each sample rack C30 inside the sample measurement unit 1a or the sample measurement unit 1b first receives the sample containers C3 supplied from the sample rack setting part 41. Next, the sample rack C30 is processed in the sample measurement unit 1a or the sample measurement unit 1b and then discharges the sample containers C3 to the sample collection path KR.

Note that the sample transport path KF and the sample collection path KR are desirably provided in two stages of an upper stage and a lower stage, respectively, to suppress an increase in the dimension of the sample measurement system 100 in the horizontal direction. Typically, the sample collection path KR may be provided directly below the sample transport path KF or the sample collection path KR may be provided directly above the sample transport path KF. In other words, the sample transport path KF and the sample collection path KR are provided at positions substantially overlapping each other as viewed in the vertical direction. For example, when the sample transport path KF is provided in the upper stage and the sample collection path KR is provided in the lower stage, the sample rack setting part 41 is provided above the sample rack collector 42. Note that, although either the sample transport path KF or the sample collection path KR may be provided above the other, the configuration in which the sample collection path KR is provided in the lower level is more intuitively understandable and has better usability.

The reagent container holding unit 5 holds reagent containers and includes a reagent container supplier 51. The reagent container supplier 51 holds the reagents to be supplied to the sample measurement units 1a, 1b, puts the reagents into the reagent containers, and discharges the reagent containers to a reagent container transport path LF (second transport path, transport path).

The reagent container transport path LF extends from the reagent container supplier 51, passes over the sample setting unit 4 and the consumable setting unit 2, and passes through the insides of the cases of the sample measurement units 1a, 1b.

The reagent container transport path LF is a path for transporting the reagent containers from the reagent container holding unit 5 to the sample measurement units 1a, 1b. The reagent container supplier 51 supplies the reagent containers to the sample measurement units 1a, 1b through the reagent container transport path LF.

A used reagent container transport path LR (collection path) extends from a used reagent container accumulation part 25 included in the consumable setting unit 2 and passes through the insides of the cases of the sample setting unit 4, the consumable setting unit 2, and the sample measurement units 1a, 1b. The used reagent container transport path LR is a path for transporting the reagent containers emptied by being used in the sample measurement units 1a, 1b, to the used reagent container accumulation part 25. The used reagent container accumulation part 25 is a part for collecting the used reagent containers.

A reagent container transfer path LTa is provided in the sample measurement unit 1a and is provided between the reagent container transport path LF and the used reagent container transport path LR. After the reagent containers transported by the reagent container transport path LF are used in the sample measurement unit 1a, the reagent container transfer path LTa transfers the used reagent containers to the used reagent container transport path LR. A reagent container transfer path LTb is provided in the sample measurement unit 1b and is provided between the reagent container transport path LF and the used reagent container transport path LR. After the reagent containers transported by the reagent container transport path LF are used in the sample measurement unit 1b, the reagent container transfer path LTb transfers the used reagent containers to the used reagent container transport path LR.

The used reagent container accumulation part 25 collects the reagent containers emptied by being used in the sample measurement units 1a, 1b. The user can dispose the reagent containers collected by the used reagent container accumulation part 25.

Figure 5:
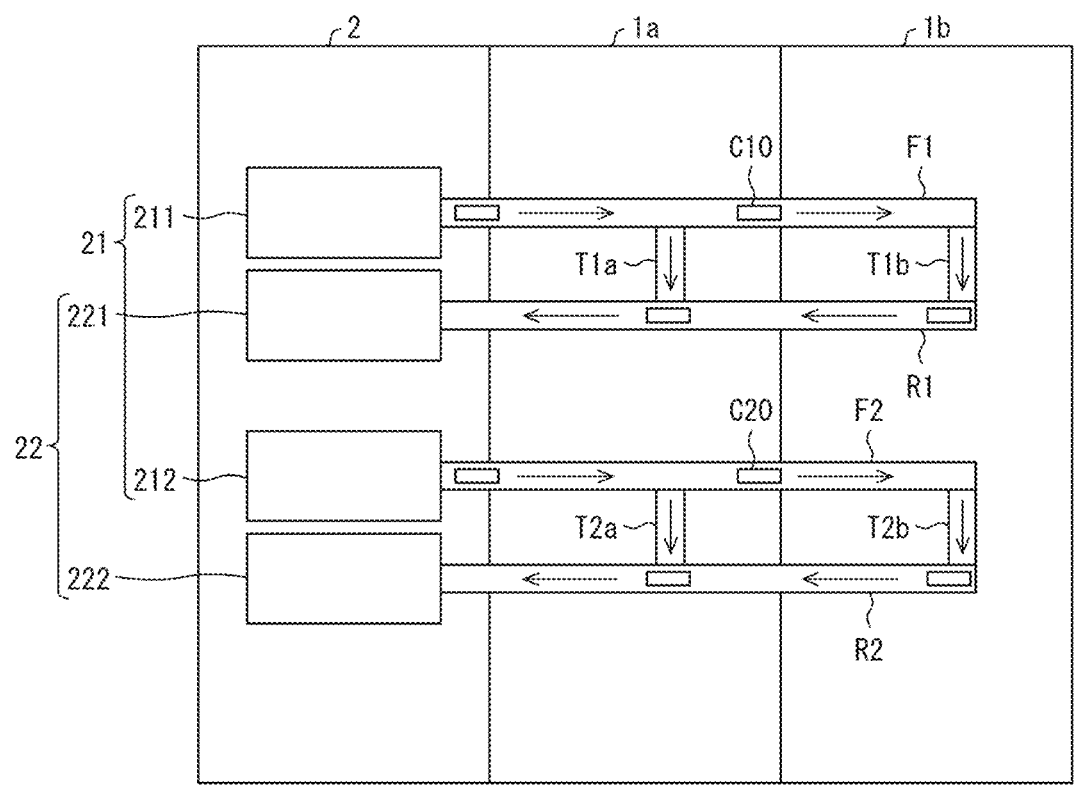
FIG. 5 is a schematic view illustrating an outline of transport paths for transporting cuvettes and pipet tips separately to sample measurement units.

In the sample measurement system 100, the consumable rack setting part 21, the first transport path, the consumable rack collector 22, and the second transport path may be provided for each type of consumable. For example, in the example illustrated in FIG. 5, the consumable setting unit 2 includes a cuvette rack setting part 211 and a cuvette rack collector 221 dedicated to the consumable racks C10 housing the cuvettes C1 and a pipet tip rack setting part 212 and a pipet tip rack collector 222 dedicated to the consumable racks C20 housing the pipet tips C2. Note that, in FIG. 5, the sample setting unit 4, the reagent container holding unit 5, the cleaning liquid holding unit 6, and the information management device 7 in the sample measurement system 100 are omitted.

A first transport path F1 extends from the cuvette rack setting part 211 and passes through the insides of the cases of the sample measurement units 1a, 1b. The first transport path F1 is a path for transporting the cuvettes C1 from the consumable setting unit 2 to the sample measurement units 1a, 1b. The cuvettes C1 are supplied from the cuvette rack setting part 211 to the sample measurement units 1a, 1b through the first transport path F1.

A first transport path F2 extends from the pipet tip rack setting part 212 and passes through the insides of the cases of the sample measurement units 1a, 1b. The first transport path F2 is a path for transporting the pipet tips C2 from the consumable setting unit 2 to the sample measurement units 1a, 1b. The pipet tips C2 are supplied from the pipet tip rack setting part 212 to the sample measurement units 1a, 1b through the first transport path F2.

A second transport path R1 extends from the cuvette rack collector 221 and passes through the insides of the cases of the sample measurement units 1a, 1b. The second transport path R1 is a path for transporting the consumable racks C10, emptied as a result of usage of the cuvettes C1 in at least one of the sample measurement units 1a, 1b, to the consumable setting unit 2. Specifically, the second transport path R1 transports the consumable racks C10 to the cuvette rack collector 221 in the consumable setting unit 2.

A second transport path R2 extends from the pipet tip rack collector 222 and passes through the insides of the cases of the sample measurement units 1a, 1b. The second transport path R2 is a path for transporting the consumable racks C20, emptied as a result of usage of the pipet tips C2 in at least one of the sample measurement units 1a, 1b, to the consumable setting unit 2. Specifically, the second transport path R2 transports the consumable racks C20 to the pipet tip rack collector 222 in the consumable setting unit 2.

A consumable transfer path T1a is provided in the sample measurement unit 1a and is provided between the first transport path F1 and the second transport path R1. After the cuvettes C1 transported by the first transport path F1 are used in the sample measurement unit 1a, the consumable transfer path T1a transfers the processed cuvettes C1 to the second transport path R1. A consumable transfer path T1b is provided in the sample measurement unit 1b and is provided between the first transport path F1 and the second transport path R1. After the cuvettes C1 transported by the first transport path F1 are used in the sample measurement unit 1b, the consumable transfer path T1b transfers the processed cuvettes C1 to the second transport path R1.

The cuvette rack collector 221 collects the cuvettes C1 used in the sample measurement units 1a, 1b. The user can dispose the cuvettes C1 collected by the cuvette rack collector 221.

Meanwhile, in the first transport path F2, the second transport path R2, a consumable transfer path T2a, and a consumable transfer path T2b, processing is performed on the pipet tips C2 as in the first transport path F1, the second transport path R1, the consumable transfer path T1a, and the consumable transfer path T1b.

Figure 6:
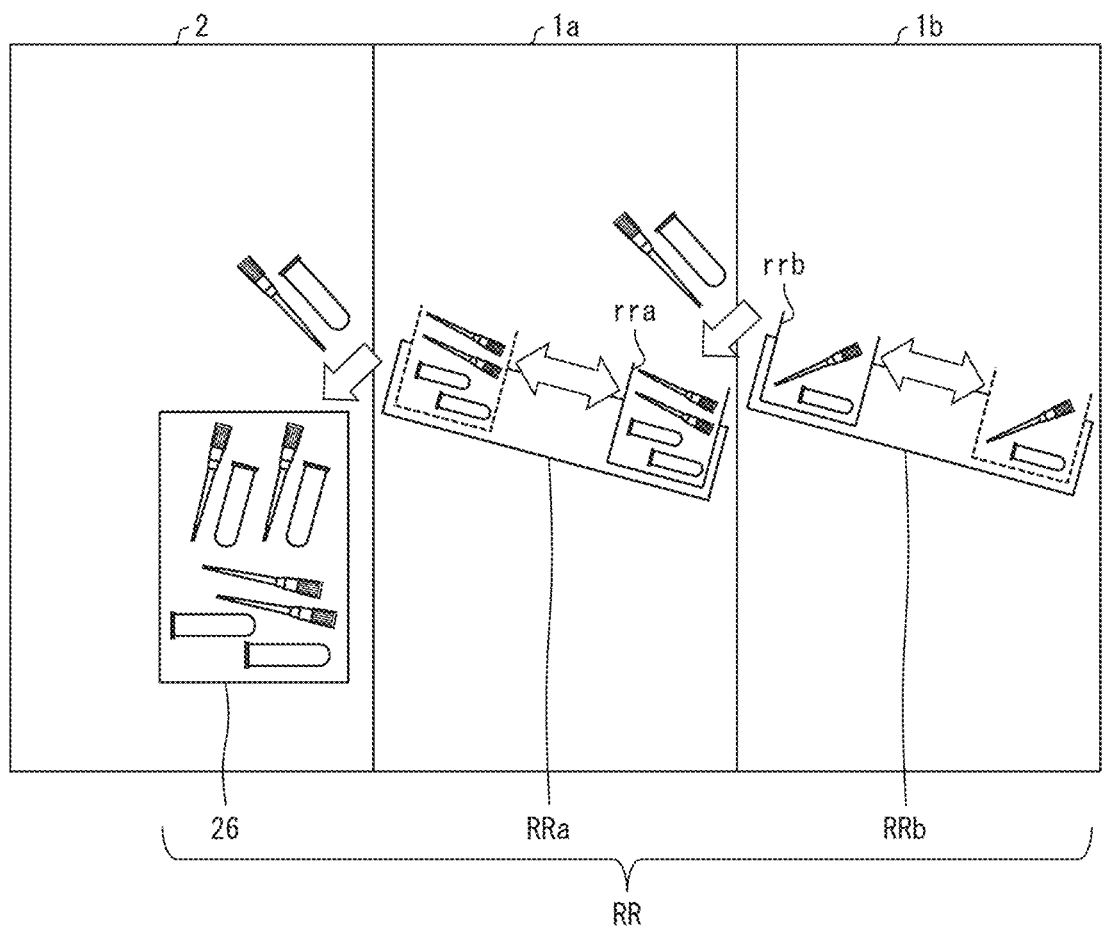
FIG. 6 is a schematic diagram illustrating an outline of a consumable collection path.

Next, a consumable collection path RR for collecting the consumables used while passing through at least one of the sample measurement units 1a, 1b into the consumable setting unit 2 is described by using FIG. 6. Note that, in FIG. 6, the sample setting unit 4, the reagent container holding unit 5, the cleaning liquid holding unit 6, and the information management device 7 in the sample measurement system 100 are omitted. The consumable collection path RR is formed of consumable collection mechanisms RRa and RRb provided in the sample measurement unit 1a and the sample measurement unit 1b, respectively.

Specifically, the sample measurement unit 1b includes the consumable collection mechanism RRb for transporting the consumables used in the sample measurement unit 1b on the farther side from the consumable setting unit 2 to the sample measurement unit 1a on the closer side to the consumable setting unit 2 or to the consumable setting unit 2. In this case, the sample measurement units 1a, 1b are arranged adjacent to each other.

The consumable collection mechanisms RRa and RRb include housing parts rra and rrb, respectively. The transport of the used consumables is performed by moving the housing parts rra and rrb. The housing parts rra and rrb have structures in which upper portions thereof are open and may be configured such that the consumables used in measurement parts 10 located above the housing parts rra and rrb are housed in the housing parts rra and rrb.

After the consumables used in the sample measurement unit 1b are housed in the housing part rrb, the sample measurement unit 1b drives the consumable collection mechanism RRb to move the housing part rrb close to the sample measurement unit 1a. After the housing part rrb is moved close to the sample measurement unit 1a, the sample measurement unit 1b tilts the housing part rrb to transfer the consumables housed in the housing part rrb to the housing part rra of the sample measurement unit 1a.

After the consumables used in the sample measurement unit 1b and the consumables used in the sample measurement unit 1a are housed in the housing part rra, the sample measurement unit 1a drives the consumable collection mechanism RRa to move the housing part rra close to the consumable setting unit 2 adjacent to the sample measurement unit 1a. After the housing part rra is moved close to the consumable setting unit 2, the sample measurement unit 1a tilts the housing part rra such that the consumables housed in the housing part rra are accumulated in a consumable accumulation part 26. Note that the consumable accumulation part 26 is desirably provided near the consumable setting unit 2 and, for example, may be provided in the case of the consumable setting unit 2. The consumables used in the sample measurement units 1a, 1b are collected into the consumable accumulation part 26. In such a configuration, the user does not have to go to the sample measurement units 1a, 1b to collect the used consumables and the usability of the sample measurement system 100 can be improved.

(Control System of Sample Measurement System 100)

Figure 7:
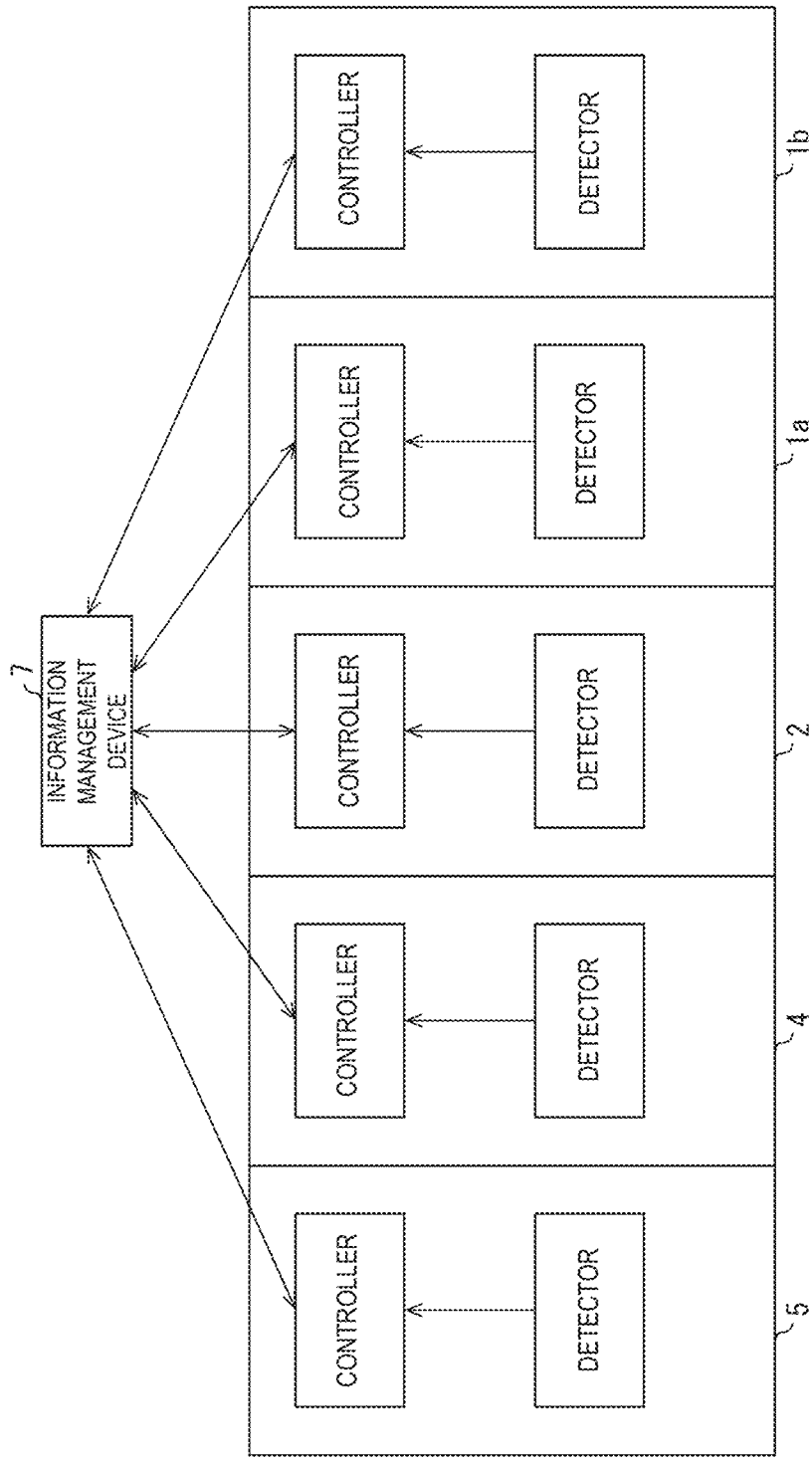
FIG. 7 is a diagram illustrating an example of a configuration that integrally controls operations of functional units included in a sample measurement system.

Next, a control system of the sample measurement system 100 is described by using FIG. 7. FIG. 7 is a diagram illustrating an example of a configuration that integrally controls operations of the functional units included in the sample measurement system 100. As illustrated in FIG. 7, the information management device 7 integrally controls operations of the functional units included in the sample measurement system 100.

<Information Management Device 7>

The information management device 7 is communicably connected to controllers of the respective functional units included in the sample measurement system 100 and integrally manages various types of information from the functional units obtained in the functional units. For example, the information management device 7 may be a computer that can function as a WAM (middleware) in the sample measurement system 100.

Detection information detected by a detector (for example, barcode reader, various sensors, and the like) provided in each functional unit is sent to the controller of the functional unit.

Specifically, the information management device 7 obtains, for example, the following pieces of information, although not limited to these, and manages or is managing the supply conditions of the reagent containers, the sample racks C30, and the consumable racks C10, C20 to each of the sample measurement units 1a, 1b as appropriate:

Information on the reagent containers held in the sample measurement units 1a, 1b (for example, the reagent IDs, the usage amounts of the reagents, the usage frequency, the remaining amount, or the like);

Information on the sample containers C3 held in the reagent container holding unit 5 (for example, sample IDs or the like);

Conditions of processing operations in the sample measurement units 1a, 1b (for example, presence or absence of abnormality or the like);

Information on the reagent containers held by the sample measurement units 1a, 1b (for example, reagent IDs or the like);

Identification information of the consumable racks C10, C20 transported from the consumable setting unit 2; and the like.

(Arrangement of Functional Units and Transport Paths in Sample Measurement System 100)

Figure 8:
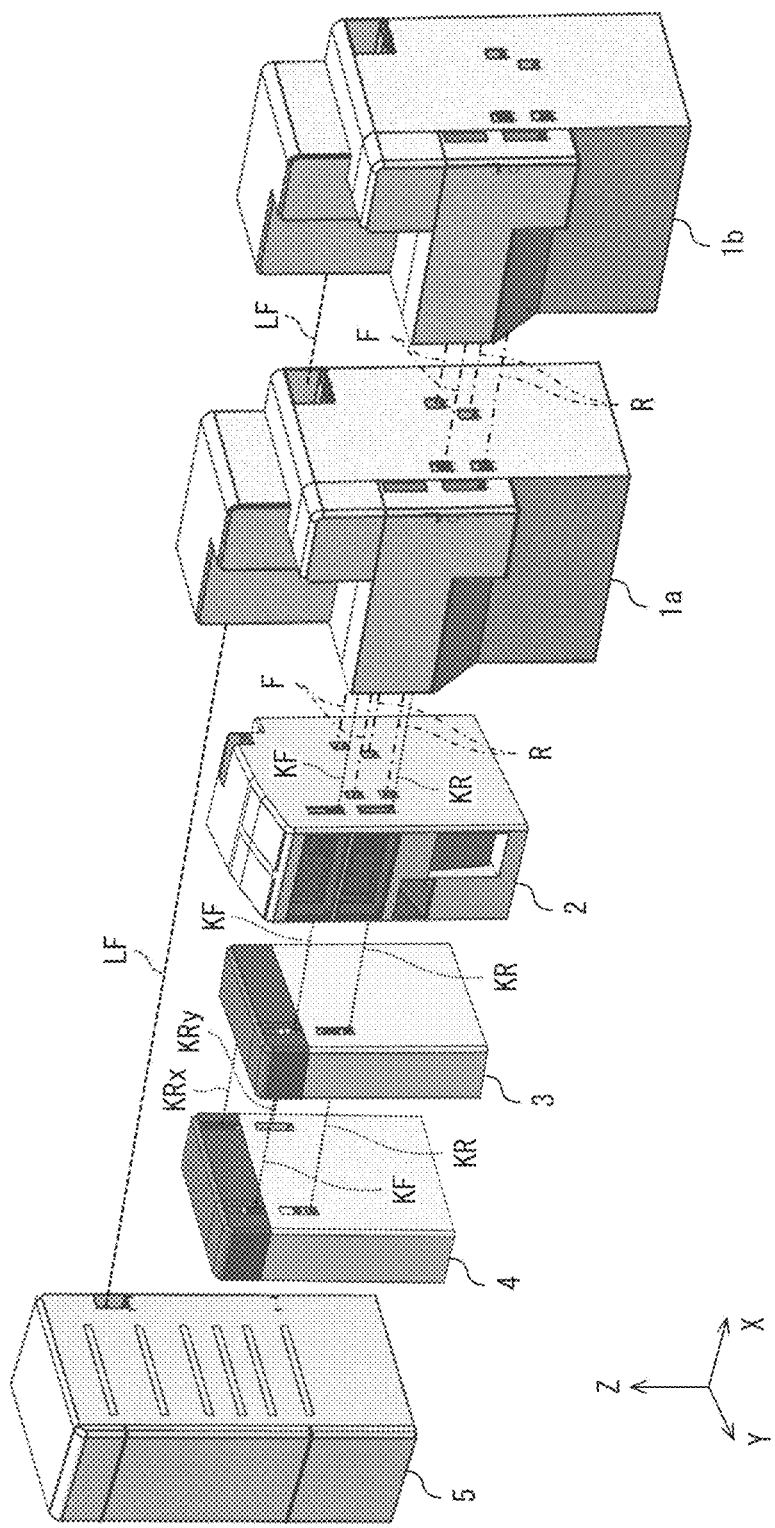
FIG. 8 is a perspective view illustrating an arrangement example of a functional units and the transport paths in a sample measurement system including sample measurement units.
Figure 9:
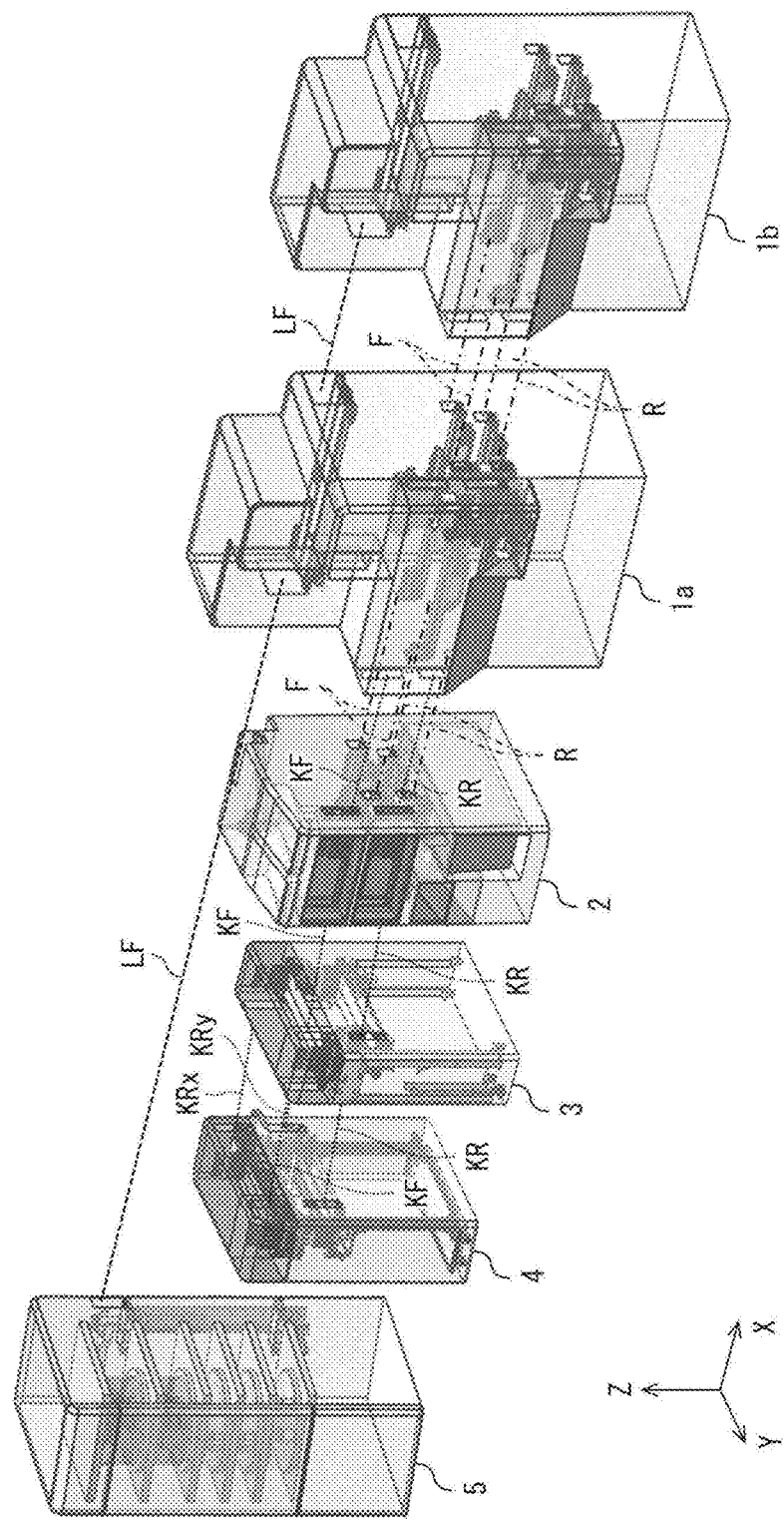
FIG. 9 is a transparent perspective view illustrating an arrangement example of functional units and transport paths in a sample measurement system including sample measurement units.

Next, an arrangement example and transport paths in the case where the sample measurement units 1a, 1b that are functional units of the sample measurement system 100 including two sample measurement units are arranged in a line in an x-axis direction are described by using FIGS. 8 and 9. FIG. 8 is a perspective view illustrating the arrangement example of the functional units and the transport paths in the sample measurement system 100 including the sample measurement units 1a, 1b and FIG. 9 is a transparent perspective view illustrating the arrangement example of the functional units and the transport paths in the sample measurement system 100 including the sample measurement units 1a, 1b. Note that the arrangement is not limited to the aforementioned arrangement and the functional units may be arranged at desired positions.

In order to maintain the processing performances of the respective sample measurement units 1a, 1b included in the sample measurement system 100, the functional units are desirably arranged such that the consumables used in the sample measurement units 1a, 1b and the samples and the reagents provided for the measurement can be smoothly supplied. Generally, one pipet tip C2 and one cuvette C1 are required to complete measurement for one sample. Meanwhile, each reagent container contains a reagent in such an amount that measurement can be performed on multiple samples. Accordingly, the number of reagent containers to be supplied is smaller than the number of consumables and samples to be supplied from the functional units other than the sample measurement units 1a, 1b to the sample measurement units 1a, 1b.

For example, when the sample measurement units 1a, 1b are arranged adjacent to each other as illustrated in FIGS. 1, 8, and 9, the consumable setting unit 2 is desirably arranged directly adjacent to the sample measurement unit 1a that is the sample measurement unit closer to a center portion of the sample measurement system 100. The consumable setting unit 2 is desirably arranged adjacent to at least one of the sample measurement units 1a, 1b.

Figure 4B:
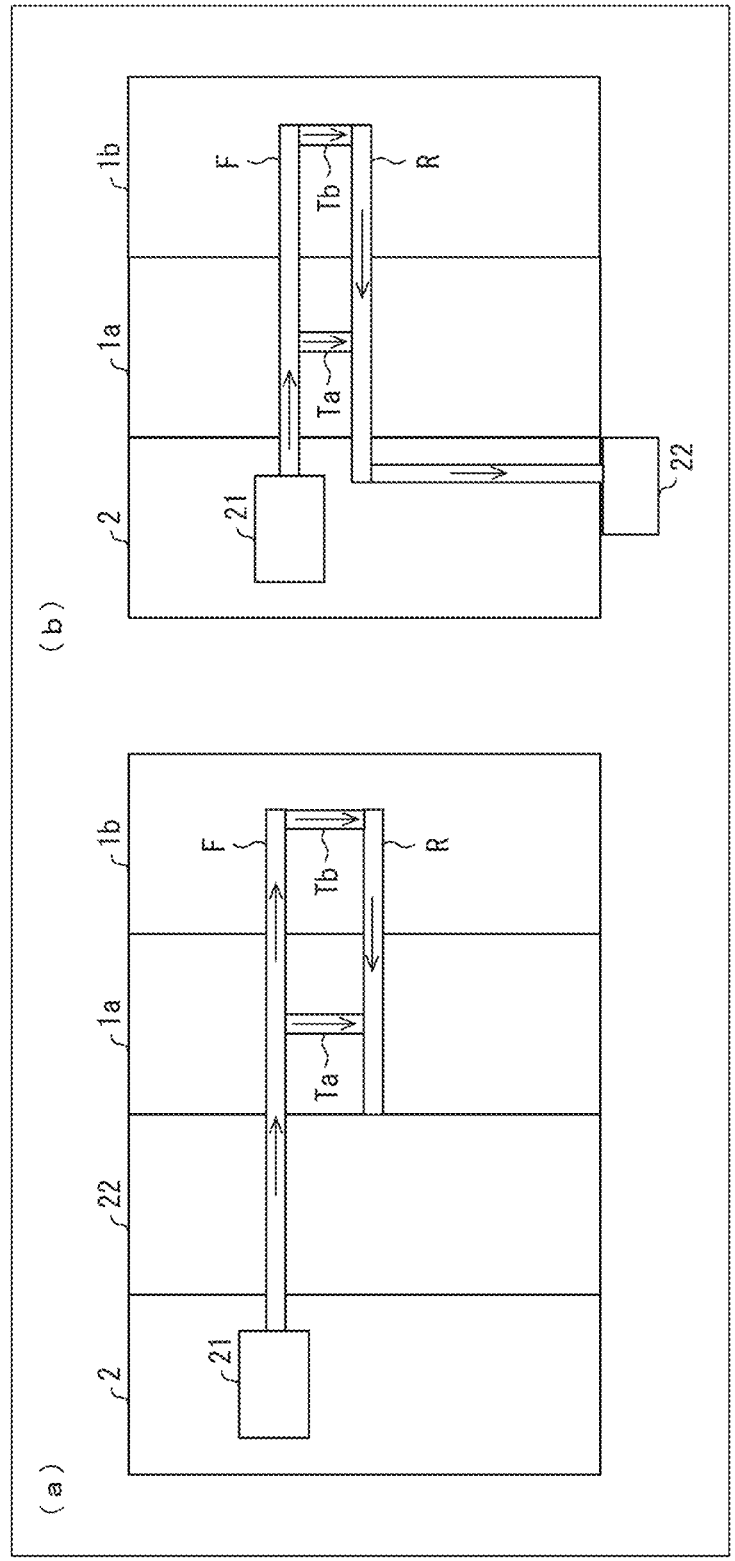
FIG. 4B is a schematic diagram illustrating another example of a consumable rack collector included in a sample measurement system.

FIGS. 8 and 9 illustrate the arrangement example of the transport paths provided in the sample measurement system 100. Note that the transport paths already described in FIGS. 4A and 4B are denoted by the same reference signs.

(Outline of Functional Units Included in Sample Measurement System 100)

Main functions and schematic configurations of the functional units included in the sample measurement system 100 are described below. Note that description is given below of the case where the functional units of the sample measurement system 100 are configured to be arranged in the order as illustrated in FIGS. 1, 7, and 8, as an example. Specifically, the sample measurement unit 1b is arranged on the right side of the sample measurement unit 1a and the consumable setting unit 2, the sample sorting unit 3, the sample setting unit 4, the reagent container holding unit 5, and the cleaning liquid holding unit 6 are arranged on the left side of the sample measurement unit 1a in this order.

<Sample Measurement Units 1a, 1b>

First, the configurations of the sample measurement units 1a, 1b are described with reference to FIGS. 10A to 10D. FIGS. 10A to 10D are perspective views illustrating the schematic configuration of the sample measurement unit 1a. As illustrated in FIGS. 10A to 10D, lids 301a, 302a are formed in the sample measurement unit 1a. Details of the lids 301a, 302a are described later.

Opening portions 10F1, 10R1, 11F1, 11R1, 10KF1, 10KR1, 10L1 are formed in a left side surface of the sample measurement unit 1a. The left side surface of the sample measurement unit 1a is a surface on the side facing the consumable setting unit 2. The consumables transported from the consumable setting unit 2 through the first transport paths F enter the sample measurement unit 1a from the opening portions 10F1, 11F1. Specifically, the cuvette C1 and the pipet tip C2 enter the sample measurement unit 1a from the opening portions 10F1, 11F1, respectively.

The consumables used in the sample measurement unit 1a are discharged from the opening portions 10R1, 11 R1 to the second transport paths R. Specifically, the cuvette C1 and the pipet tip C2 used in the sample measurement unit 1a are discharged respectively from the opening portions 10R1, 11 R1 to the second transport paths R.

The sample rack C30 transported from the sample setting unit 4 through the sample transport path KF enters the sample measurement unit 1a from the opening portion 10KF1. The sample rack C30 holding the sample containers C3 containing the samples measured in the sample measurement unit 1a is discharged from the opening portion 10KR1 to the sample collection path KR.

The reagent container transported from the reagent container holding unit 5 through the reagent container transport path LF enters the sample measurement unit 1a from the opening portion 101_1. Moreover, the reagent container used in the sample measurement unit 1a is discharged from the opening portion 10L1 to the used reagent container transport path LR.

Meanwhile, opening portions 10F2, 10R2, 11F2, 11 R2, 10KF2, 10KR2, 10L2 are formed on a right side surface of the sample measurement unit 1a. The right side surface of the sample measurement unit 1a is a surface on the side facing the sample measurement unit 1b. The consumables to be used in the sample measurement unit 1b are discharged from the opening portions 10F2, 11F2 to the first transport paths F. Specifically, the cuvette C1 and the pipet tip C2 to be used in the sample measurement unit 1b are discharged respectively from the opening portions 10F2, 11F2 to the first transport paths F.

The consumables used in the sample measurement unit 1b enter the sample measurement unit 1a from the opening portions 10R2, 11 R2 by being transported through the second transport paths R. Specifically, the cuvette C1 and the pipet tip C2 used in the sample measurement unit 1b enter the sample measurement unit 1a respectively from the opening portions 10R2, 11 R2 by being transported through the second transport paths R.

The sample rack C30 holding the sample containers C3 containing the sample to be provided for the measurement of the samples in the sample measurement unit 1b is discharged from the opening portion 10KF2 to the sample transport path KF. The sample rack C30 holding the sample containers C3 containing the samples measured in the sample measurement unit 1b enters the sample measurement unit 1a from the opening portion 10KR2 by being transported through the sample collection path KR.

The reagent container to be used in the sample measurement unit 1b is discharged from the opening portion 10L2 to the reagent container transport path LF. Moreover, the reagent container used in the sample measurement unit 1b enters the sample measurement unit 1a from the opening portion L2 by being transported through the used reagent container transport path LR.

Next, internal configurations of the sample measurement units 1a, 1b are described with reference to FIG. 11.

Figure 11:
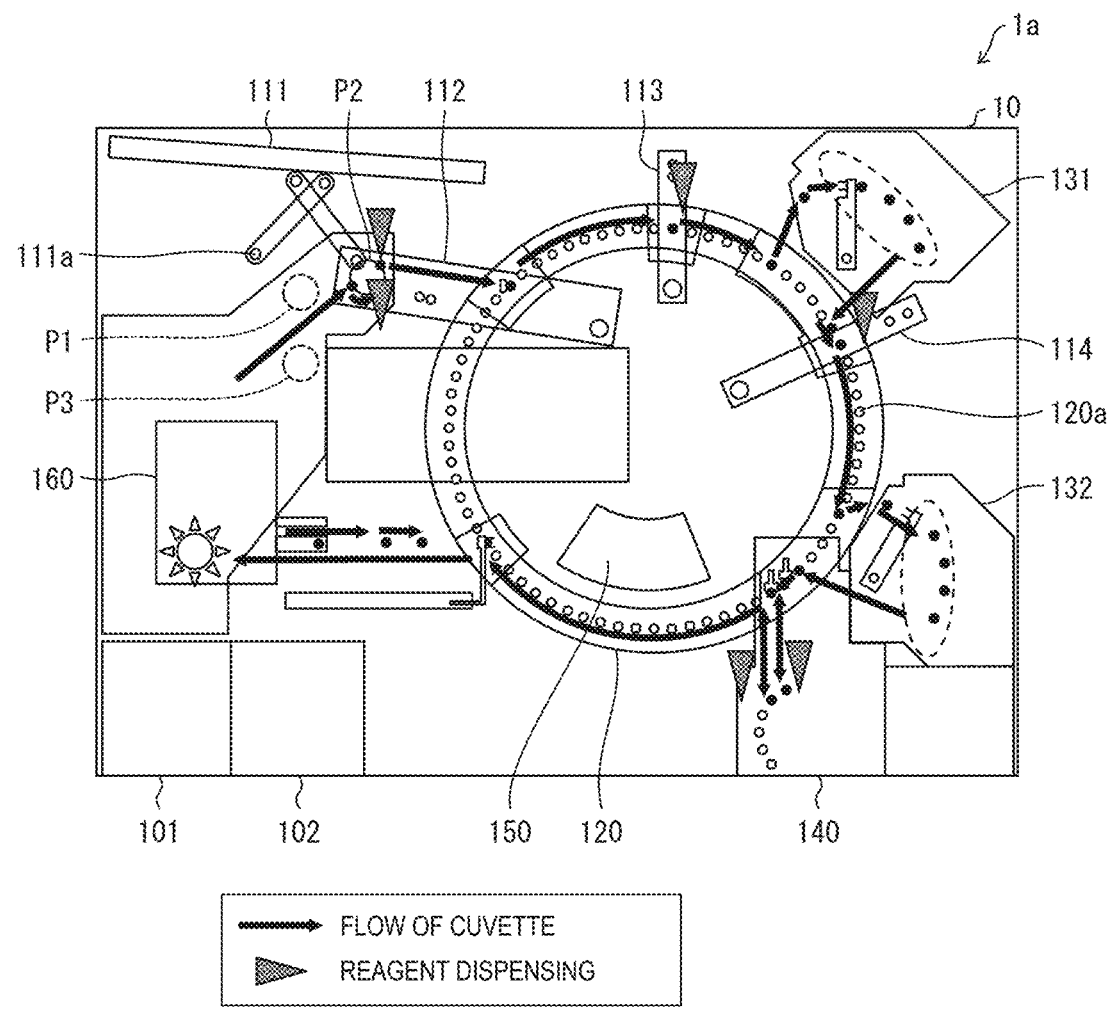
FIG. 11 is a plan view illustrating a configuration of a measurement part of the sample measurement unit as viewed from above.

FIG. 11 is a plan view illustrating a configuration of a measurement part 10 of the sample measurement unit 1a as viewed from above. The sample measurement unit 1a includes the measurement part 10 and a display input part (see FIG. 1) formed of a touch panel.

The sample rack C30 holding the sample containers containing the samples are transported from the sample setting unit 4 to the sample measurement unit 1a. The measurement part 10 performs measurement by aspirating the samples from the sample containers transported from the sample setting unit 4 and positioned at a predetermined position.

The measurement part 10 includes a cuvette supplier 101 and a pipet tip supplier 102 and also includes, as measurement mechanism portions for performing sample measurement by using the cuvettes C1 supplied from the cuvette supplier 101 and the pipet tips C2 supplied from the pipet tip supplier 102, a sample dispensing arm 111, an R1 reagent dispensing arm 112, an R2 reagent dispensing arm 113, an R3 reagent dispensing arm 114, a reaction part 120, a primary BF (Bound Free) separator 131, a secondary BF separator 132, an R4/R5 reagent supplier 140, a reagent setting part 150, and a detector 160.

Figure 12:
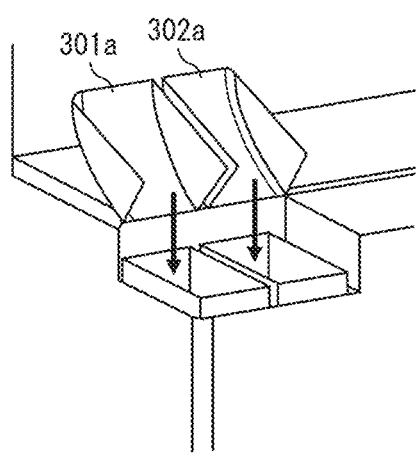
FIG. 12 is a perspective view illustrating lids provided in upper portions of a cuvette supplier and a pipet tip supplier.

As illustrated in FIG. 12, the lid 301a and the lid 302a are provided in upper portions of the cuvette supplier 101 and the pipet tip supplier 102, respectively. The user opens the lid 301a to put the cuvettes C1 to be used in the measurement operations into the cuvette supplier 101 and opens the lid 302a to put the pipet tips C2 to be used in the measurement operation into the pipet tip supplier 102.

Returning to FIG. 11, in the sample measurement unit 1a, each sample such as blood that is the measurement target is mixed with a buffer solution (R1 reagent), and a reagent (R2 reagent) containing magnetic particles supporting a capture antibody that binds with an antigen included in the sample is added to the obtained mixture liquid. The magnetic particles supporting the capture antibody binding with the antigen are drawn to a magnet in the primary BF separator 131 and components in the sample that do not bind with the capture antibody are thereby removed. Next, a labeled antibody (R3 reagent) is further added and then the magnetic particles supporting the capture antibody binding with the labeled antibody and the antigen are drawn to a magnet in the secondary BF separator 132 and the R3 reagent containing unreacted labeled antibody is removed. Next, a dispersion solution (R4 reagent) and a fluorescent substrate (R5 reagent) that emits light in a reaction process with the labeled antibody are added and then the amount of light emitted by the reaction between the labeled antibody and the fluorescent substrate is measured. The antigen binding with the labeled antibody and included in the sample is quantitatively measured through the aforementioned process.

The pipet tip rack setting part 212 supplies the pipet tips C2 to a tip attaching position (not illustrated) of the sample dispensing arm 111 one by one. The pipet tip C2 positioned at the tip attaching position is attached to a front end of a pipet (not illustrated) in the sample dispensing arm 111.

The R1 reagent dispensing arm 112 aspirates the R1 reagent set in the reagent setting part 150 and discharges the aspirated R1 reagent into the cuvette C1 at a reagent discharging position P1 by using a pipet (not illustrated). A not-illustrated catcher positions the cuvette C1 to which the R1 reagent is discharged at a position P2 for the sample. The sample dispensing arm 111 aspirates the sample in the sample container transported from the sample setting unit 4 to a position P3 and discharges the aspirated sample into the cuvette C1 at the position P2 by using the attached pipet tip C2. The not-illustrated catcher transfers this cuvette C1 to the reaction part 120. When the sample dispensing arm 111 completes dispensing of one sample, the pipet tip C2 used in the dispensing of this sample is returned to the second transport path R.

The R2 reagent dispensing arm 113 aspirates the R2 reagent set in the reagent setting part 150 and discharges the aspirated R2 reagent into the cuvette C1 containing the R1 reagent and the sample by using a pipet (not illustrated).

The reaction part 120 is formed in an annular shape to surround a periphery of the reagent setting part 150 and has cuvette setting portions 120a arranged at predetermined intervals along an outer shape. Moreover, the reaction part 120 is configured to be rotatable and moves each cuvette setting portion 120a to process positions where the respective processes (dispensing of reagents and the like) are performed. The cuvettes C1 set in the cuvette setting portions 120a are heated to about 42° C. The reaction between the samples and the various reagents in the cuvettes C1 is thereby promoted.

The not-illustrated catcher transfers the cuvette C1 containing the sample, the R1 reagent, and the R2 reagent from the reaction part 120 to the primary BF separator 131. The primary BF separator 131 removes the components in the specimen that do not bind with the capture antibody, from the sample in the cuvette C1. The R3 reagent dispensing arm 114 aspirates the R3 reagent set in the reagent setting part 150 and discharges the aspirated R3 reagent into the cuvette C1 transferred from the primary BF separator 131 to the reaction part 120 by using a pipet (not illustrated).

The not-illustrated catcher transfers the cuvette C1 containing the R3 reagent and the specimen subjected to the removal process by the primary BF separator 131 from the reaction part 120 to the secondary BF separator 132. The secondary BF separator 132 removes the R3 reagent containing the unreacted labeled antibody. The R4/R5 reagent supplier 140 sequentially dispenses the R4 reagent and the R5 reagent into the cuvette C1 containing the specimen subjected to the removal process by the secondary BF separator 132 by using a not-illustrated tube.

The detector 160 obtains light generated in the reaction process between the fluorescent substrate and the labeled antibody binding with the antigen of the sample contained in the cuvette C1 and subjected to the predetermined processes with a photo multiplier tube to measure the amount of antigen included in the sample. When the detector 160 completes measurement of one sample, the not-illustrated catcher returns the cuvette C1 containing this sample to the second transport path R.

Figure 13:
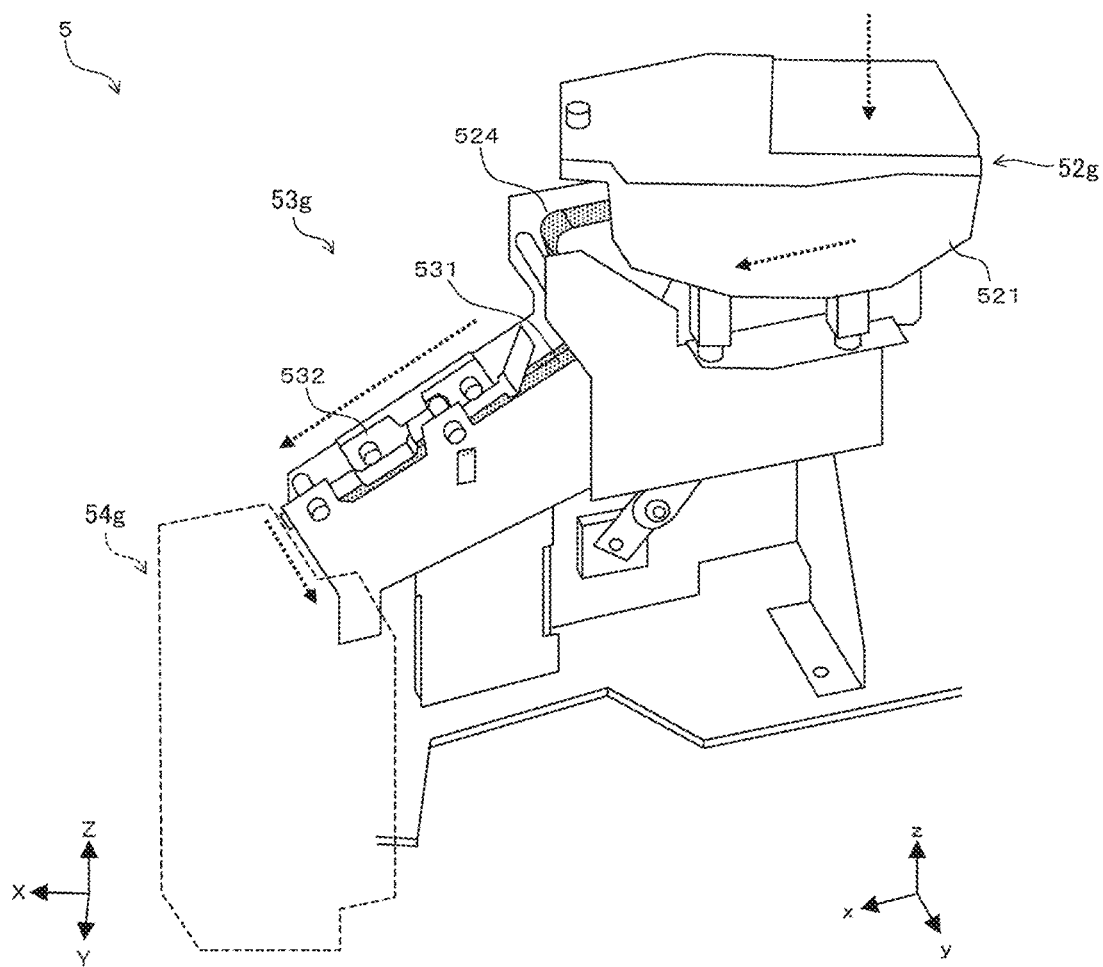
FIG. 13 is a perspective view illustrating a configuration of a cuvette supplier.
Figure 14B:
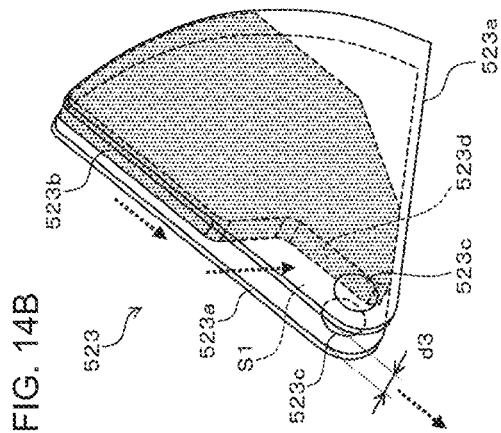
FIG. 14A is a cross-sectional view of a cuvette supplier as viewed from the side and FIGS. 14B and 14C are perspective views illustrating configurations of a swing rail and a transfer rail.
Figure 14C:
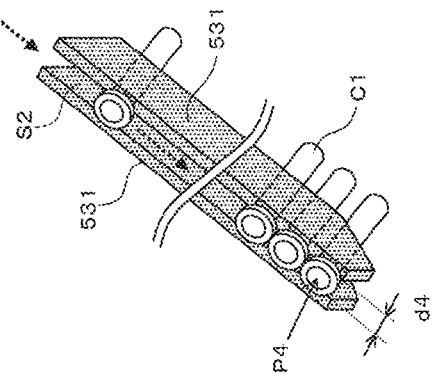
Figure 14A:
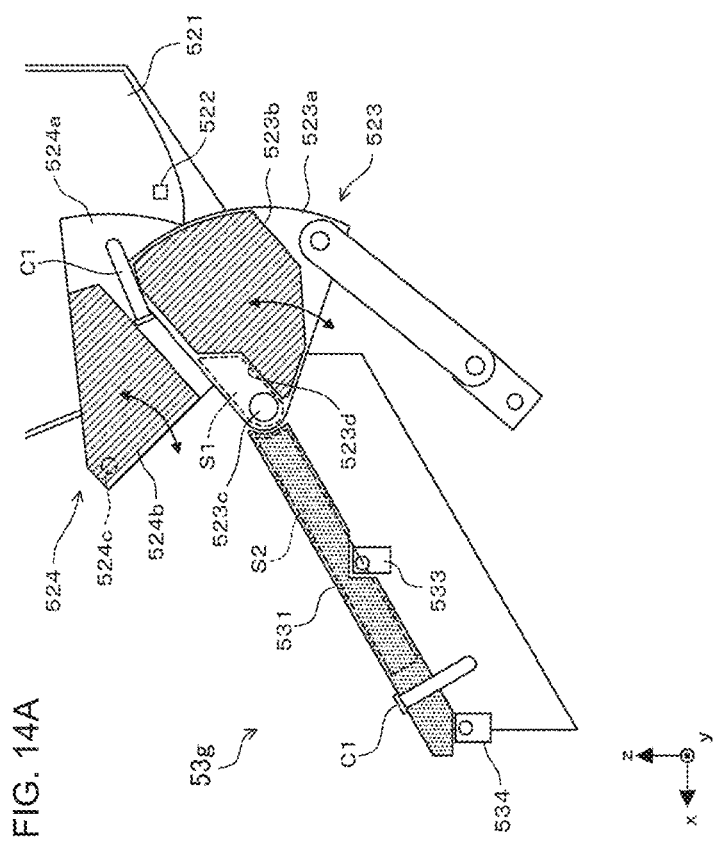

FIG. 13 is a perspective view illustrating a configuration of the cuvette supplier 101 and FIG. 14A is a cross-sectional view of the cuvette supplier 101 as viewed from the side. FIGS. 14B and 14C are perspective views illustrating configurations of a swing rail 523 and transfer rails 531. Note that x, y, and z directions illustrated in FIGS. 13 and 14A to 14C do not necessarily coincide with x, y, and z directions illustrated in the other drawings.

<<Transfer of Cuvettes C1>>

First, description is given of steps in which the cuvette supplier 101 transfers the cuvettes C1, together with the configuration of the cuvette supplier 101. The cuvettes C1 put into the cuvette supplier 101 are transferred to a second storage portion 52g.

With reference to FIG. 13 and FIG. 14A, the second storage portion 52g includes a second hopper 521, a sensor 522 having a light emitting portion and a light receiving portion, the swing rail 523, and a swing guide 524. A tilted surface is formed on a bottom surface of the second hopper 521. The cuvettes C1 are transferred from a first storage portion 51g to the second hopper 521 such that several cuvettes C1 are stored in the second hopper 521. The cuvettes C1 transferred from the first storage portion 51g are stored one on top of another in order from the bottom surface of the second hopper 521. The sensor 522 detects the cuvette C1 located on the bottom surface of the second hopper 521.

With reference to FIGS. 14A and 14B, the swing rail 523 includes paired fan-shaped plates 523a and a spacer 523b fixed by being held between the paired plates 523a. An interval d3 between the paired plates 523a (thickness of the spacer 523b) is smaller than the diameter d11 of the flange portion C11 of the cuvette C1 and is larger than the diameter d12 of the body portion C12. Moreover, a shaft hole 523c is formed in each of the paired plates 523a. The shaft hole 523c in the plate 523a on the y-axis negative direction side is turnably supported from the y-axis negative direction side and the shaft hole 523c in the plate 523a on the y-axis positive direction side is turnably supported from the y-axis positive direction side. The swing rail 523 can thereby turn about the y-axis. Moreover, a notch 523d is formed in the spacer 523b and the paired plates 523a and the spacer 523b form a space S1.

The swing guide 524 includes paired fan-shaped plates 524a in contact with the outer sides of the swing rail 523 and a spacer 524b fixed by being held between the paired plates 524a. A shaft hole 524c is formed in each of the paired plates 524a and the paired plates 524a are turnably supported from the y-axis negative direction side and the y-axis positive direction side, respectively. The swing guide 524 can thereby turn about the y-axis.

The swing rail 523 and the swing guide 524 configured as described above are linked to be integrally turnable. Swinging of the swing rail 523 and the swing guide 524 causes the cuvettes C1 to pass between the swing rail 523 and the spacer 524b of the swing guide 524 and be sent out to the transfer rails 531 of a transfer part 53g.

With reference to FIG. 13 and FIGS. 14A and 14C, the transfer part 53g includes the paired transfer rails 531, a cover 532, and reflective sensors 533, 534. An interval d4 between the paired transfer rails 531 is the same as the interval d3 between the paired plates 523a. The interval d4 provided between the paired transfer rails 531 forms a space S2.

The cuvettes C1 sent out by the swing rail 523 and the swing guide 524 (hereafter, referred to as "swing part") slide down along upper edges of the paired transfer rails 531 by their own weight and are arranged in a line in order from the lower side of the transfer rails 531. In this case, each cuvette C1 is in a state where the body portion C12 enters the space S2 and only the flange portion C11 is supported on the upper edges of the paired transfer rails 531.

The cover 532 is installed to protect upper portions of the transfer rails 531. The sensors 533, 534 are installed near an intermediate stage of the transfer rails 531 and a bottom stage of the transfer rails 531, respectively. The sensor 533 detects the cuvette C1 at a position (intermediate stage position of the transfer rails 531) in front (y-axis positive direction) of the sensor 533 and the sensor 534 detects the cuvette C1 at a position (bottom stage position P4 of the transfer rails 531) in front (y-axis positive direction) of the sensor 534.

Figure 15A:
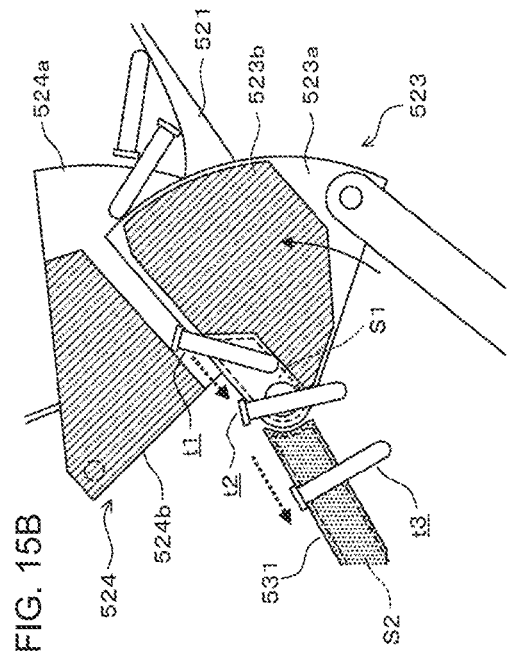
FIGS. 15A and 15B are views illustrating steps in which a swing part sends out a cuvettes on a bottom surface of a second hopper.
Figure 15B:
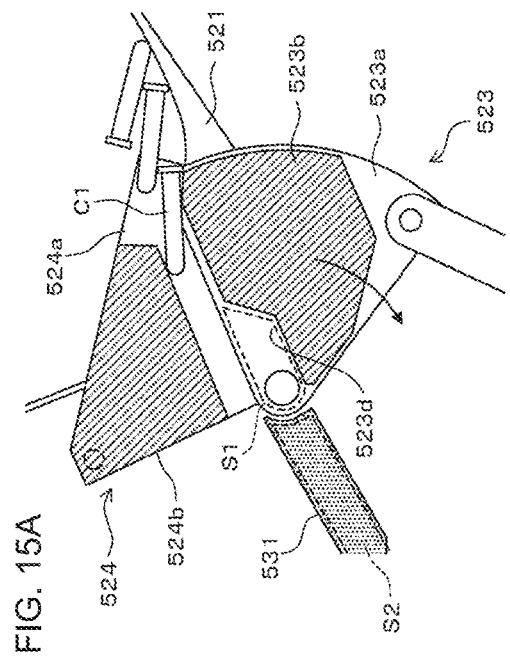

FIGS. 15A and 15B are views illustrating steps in which the swing part sends out the cuvette C1 on the bottom surface of the second hopper 521. First, the swing rail 523 and the swing guide 524 are turned downward and are positioned at a position illustrated in FIG. 15A. One cuvette C1 positioned on the bottom surface of the second hopper 521 is thereby drawn into a space between the swing rail 523 and the spacer 524b.

Next, the swing rail 523 and the swing guide 524 are turned upward and positioned at a position illustrated in FIG. 15B. The cuvette C1 drawn into the space between the swing rail 523 and the spacer 524b thereby slide down along upper edges (end portions facing the spacer 524b) of the paired plates 523a by its own weight and is sent out onto the paired transfer rails 531.

When the sliding-down cuvette C1 reaches the space S1, as illustrated in the cuvette C1 at a position t1, the flange portion C11 is supported on the upper edges of the paired plates 523a and the body portion C12 enters the space S1. When the cuvette C1 at the position t1 further slides down by its own weight, the cuvette C1 is positioned at a position t2 with the flange portion C11 supported on the upper edges of the paired plates 523a and the body portion C12 entering the space S1 as at the position t1. When the cuvette C1 at the position t2 further slides down by its own weight, the cuvette C1 is positioned at a position t3 with the flange portion C11 supported on the paired transfer rails 531 and the body portion C12 entering the space S2 as at the positions t1, t2.

Note that, although the case where the cuvette C1 enters the space between the swing rail 523 and the spacer 524b with the body portion C12 entering the space first is illustrated in FIGS. 15A and 15B, the cuvette C1 is sent out to the transfer rails 531 in a way similar to that described above also in the case where the cuvette C1 enters the space between the swing rail 523 and the spacer 524b with the flange portion C11 entering the space first. Specifically, in the cuvette C1 approaching the space S1 with the flange portion C11 approaching the space S1 first, as described above, the flange portion C11 is supported on the upper edges of the paired plates 523a and the body portion C12 enters the space S1. Accordingly, the cuvette C1 sent out to the transfer rails 531 is set to a state where the flange portion C11 is supported on the transfer rails 531 as described above.

A cut-out part 54g stops the cuvette C1 positioned at the bottom of the transfer rails 531. Moreover, when the cuvette C1 becomes necessary in the measurement operation, the cut-out part 54g transports only the cuvette C1, positioned at the bottom among the cuvettes C1 aligned on the transfer rails 531, to the reagent discharging position P1.

Note that the cuvettes C1 on the transfer rails 531 are aligned up to the position in front (y-axis positive direction)

of the sensor 533 and are not aligned above the position in front of the sensor 533. Moreover, the cover 532 is installed above the transfer rails 531.

<<Cuvette Catch>>

Figure 16A:
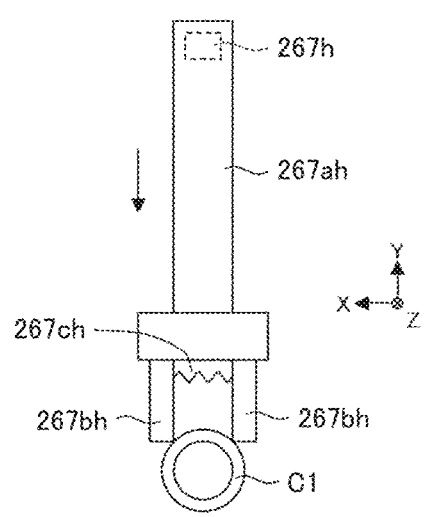
FIGS. 16A and 16B are schematic views illustrating a configuration example of a cuvette catch provided in an arm portion of a transfer part.
Figure 16B:
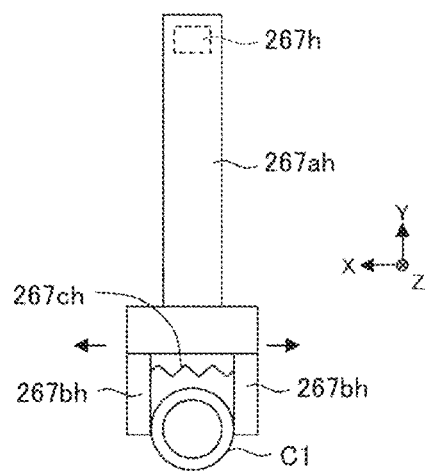

Next a configuration of a cuvette catch having a function of transferring the cuvettes C1 in the sample measurement units 1a, 1b is described by using FIGS. 16A and 16B. FIGS. 16A and 16B are schematic views illustrating a configuration example of the cuvette catch provided in an arm portion of the transfer part. Note that x, y, and z directions illustrated in FIGS. 16A to 16D do not necessarily coincide with x, y, and z directions illustrated in the other drawings, as in FIGS. 13 and 14A to 14C.

As illustrated in FIG. 16A, in the cuvette catch, an end portion of an arm portion 267ah on the Y-axis positive side is fixed to a surface of a support member 267h on the Z-axis negative side. Accordingly, the arm portion 267ah of the cuvette catch moves in the Y-axis direction with the movement of the support member 267h. Paired claws 267bh are provided in an end portion of the arm portion 267ah on the Y-axis negative side to be capable of coming close to and moving way from each other in the X-axis direction. A spring 267ch is laid between the paired claws 267bh. The paired claws 267bh are thereby biased in a direction coming close to each other. As illustrated in FIG. 16A, movements of the paired claws 267bh are restricted at positions at a predetermined interval and the paired claws 267bh are positioned at these positions.

When a motor is driven and the support member 267h is moved in the Y-axis negative direction, the arm portion 267ah is moved in the Y-axis negative direction. When the arm portion 267ah is further moved in the Y-axis negative direction from a state where the paired claws 267bh are in contact with the side surface of the cuvette C1 as illustrated in FIG. 16A, the claws 267bh slides on the side surface of the cuvette C1 and open in the direction moving away from each other. The paired claws 267bh thereby grip the cuvette C1 as illustrated in FIG. 16B. The spring 267ch applies force large enough to grip the cuvette C1 to the paired claws 267bh. The paired claws 267bh forms a grip portion that grips the cuvette C1. Release of the grip of the cuvette C1 is achieved by, for example, moving the claws 267bh in the Y-axis positive direction with the cuvette C1 inserted in a holding portion (not illustrated). The claws 267bh thereby slides on the side surface of the cuvette C1 and the grip of the cuvette C3 is released. For example, the cuvette C1 after the usage in the sample measurement unit 1b is housed in the housing part rrb.

<<Urgent Sample-Tip Transporter 20h and Sample Dispensing Arm 111>>

Figure 16C:
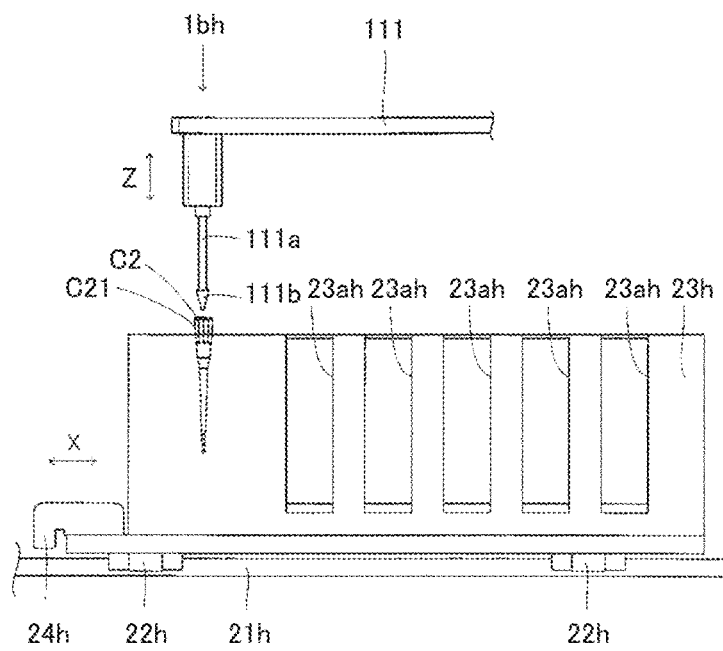
FIG. 16C is a side view illustrating a configuration example of an urgent sample-tip transporter and a sample dispensing arm.

Next, configurations of an urgent sample-tip transporter 20h and the sample dispensing arm 111 included in the sample measurement units 1a, 1b are described by using FIG. 16C. FIG. 16C is a side view illustrating a configuration example of the urgent sample-tip transporter 20h and the sample dispensing arm 111. Note that the urgent sample-tip transporter 20h is configured to transport the sample container C3, containing an urgent sample that needs to be tested by cutting into line of samples transported from the sample setting unit 4, to the attachment position of the sample dispensing arm 111. The urgent sample-tip transporter 20h includes: a linear guide formed of a slide rail 21h and a slide main body 22h provided to be movable along the slide rail 21h; a transport rack 23h attached to the slide main body 22h; a detection piece 24h attached to a lower portion of the transport rack 23h; and a light block sensor 25h light to which is blocked by the detection piece 24h. Moreover, the transport rack 23h is provided with test tube setting portions 23ah in each of which the sample container C3 containing the urgent sample is placed and a tip setting portion 23bh that has a long hole shape and is used to place the pipet tip C2 supplied from a mechanism 30h that supplies the pipet tip C2. Moreover, the detection piece 24h is arranged to block light to the light block sensor 25h when the transport rack 23h is arranged at a position where it receives the pipet tip C2 from the mechanism 30h that supplies the pipet tip. Then, the transport rack 23h is moved along the slide rail 21h by drive force of a not-illustrated motor and thereby transports the pipet tip C2 and the sample container C3 containing the urgent sample to the attachment position of the sample dispensing arm 111.

As illustrated in FIG. 16C, a nozzle portion 111a in an arm portion of the sample dispensing arm 111 is turned to the attachment position and the arm portion is then moved downward to press fit a front end 111b of the nozzle portion 111a in the arm portion to the attachment portion C21 of the pipet tip C2. The pipet tip C2 is thereby supplied from the mechanism 30h that supplies the pipet tip C2, to the sample dispensing arm 111.

Figure 16D:
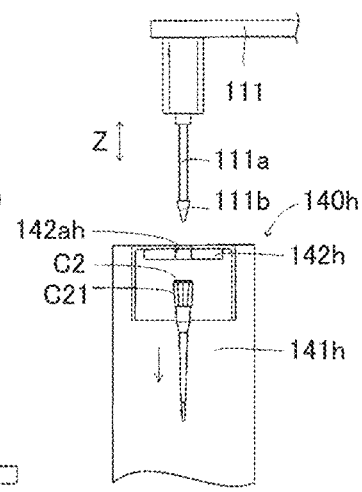
FIG. 16D is a side view for explaining an operation of removing a pipet tip attached to a sample dispensing arm.

Next, an operation of removing the pipet tip C2 from the sample dispensing arm 111 is described by using FIG. 16D. FIG. 16D is a side view for explaining the operation of removing the pipet tip C2 attached to the sample dispensing arm 111.

The sample dispensing arm 111 to which the pipet tip C2 is attached is moved upward to bring a lower surface of a release piece 142h in a tip release part 140h and an upper surface of the attachment portion C21 of the pipet tip C2 into contact with each other. Then, as illustrated in FIG. 16D, the sample dispensing arm 111 is moved upward to remove the pipet tip C2 from the front end 111b of the nozzle portion 111a in the arm portion. For example, the pipet tip C2 after the usage in the sample measurement unit 1b is housed in the housing part rrb like the cuvette C1.

Figure 17A:
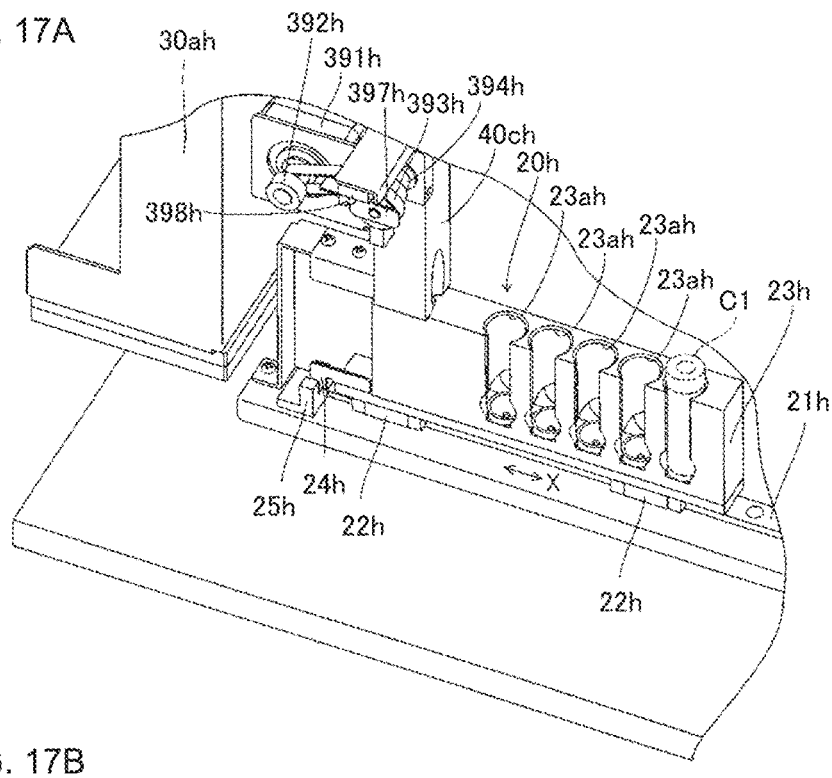
FIGS. 17A and 17B are perspective views illustrating a configuration example of an urgent sample-tip transporter.
Figure 17B:
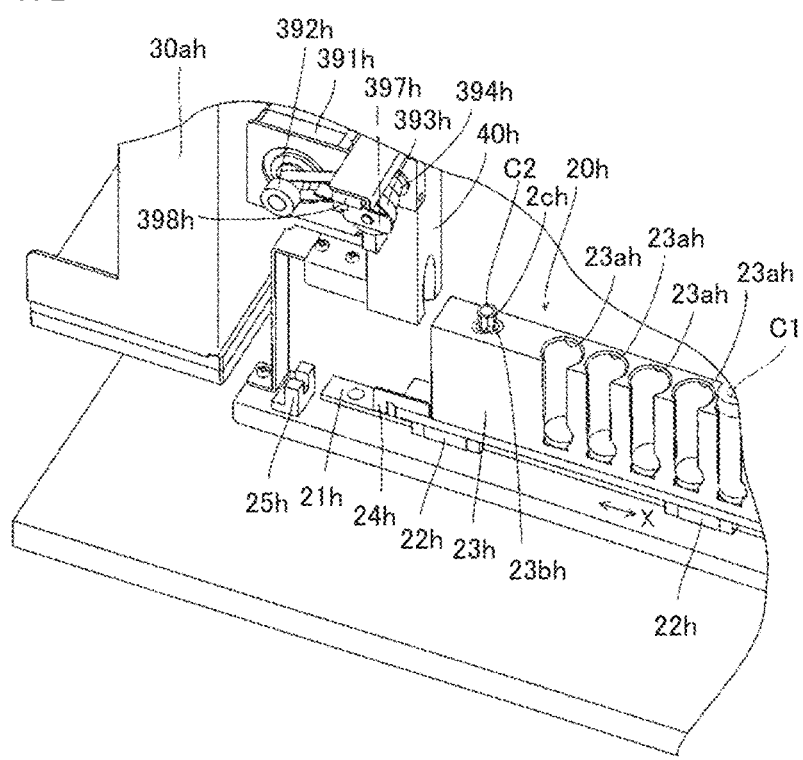

FIGS. 17A and 17B are perspective views illustrating a configuration example of the urgent sample-tip transporter 20h. As illustrated in FIGS. 17A and 17B, the pipet tip C2 is set in the tip setting portion 23bh of the transport rack 23h in the urgent sample-tip transporter 20h. In this case, the light block sensor 25h detects the detection piece 24h of the urgent sample-tip transporter 20h and the urgent sample-tip transporter 20h is thereby arranged at a position where it can receive the pipet tip C2.

Then, the pipet tip C2 placed in the tip setting portion 23bh of the transport rack 23h is transported to a position corresponding to the attachment position of the sample dispensing arm 111. Next, the nozzle portion 111a of the arm portion in the sample dispensing arm 111 is turned to the attachment position and the arm portion is then moved downward to press fit the front end 111b of the nozzle portion 111a in the arm portion to the attachment portion C21 of the pipet tip C2. The pipet tip C2 is thereby supplied from the mechanism 30h that supplies the pipet tip C2, to the sample dispensing arm 111.

<<Sample Transfer Paths KTa, KTb>>

Figure 18A:
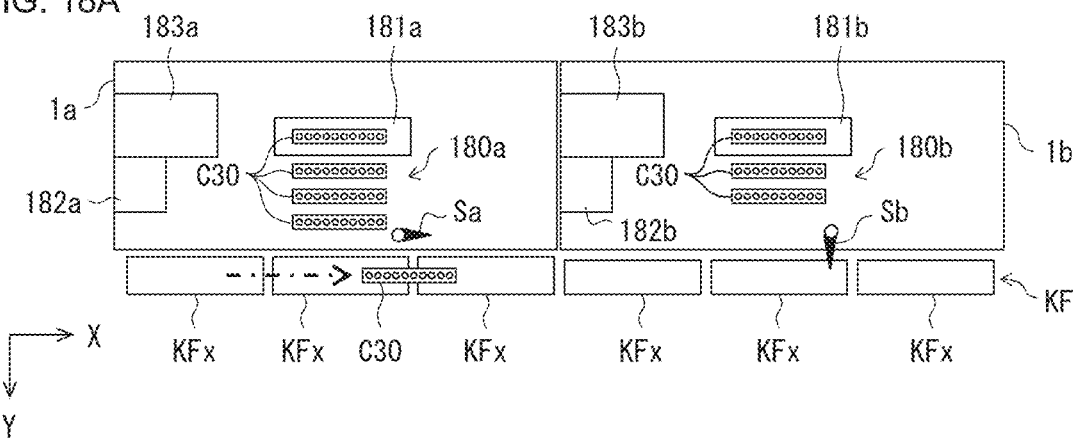
FIGS. 18A to 18C are schematic views illustrating an example of a transport path that transports the sample containers and a mechanism that loads a sample containers from a transport path in sample measurement units.
Figure 18B:
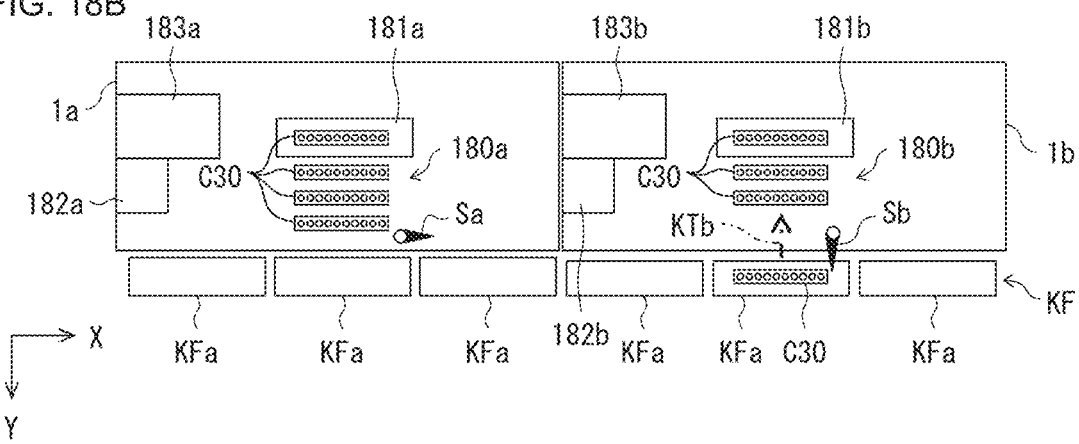
Figure 18C:
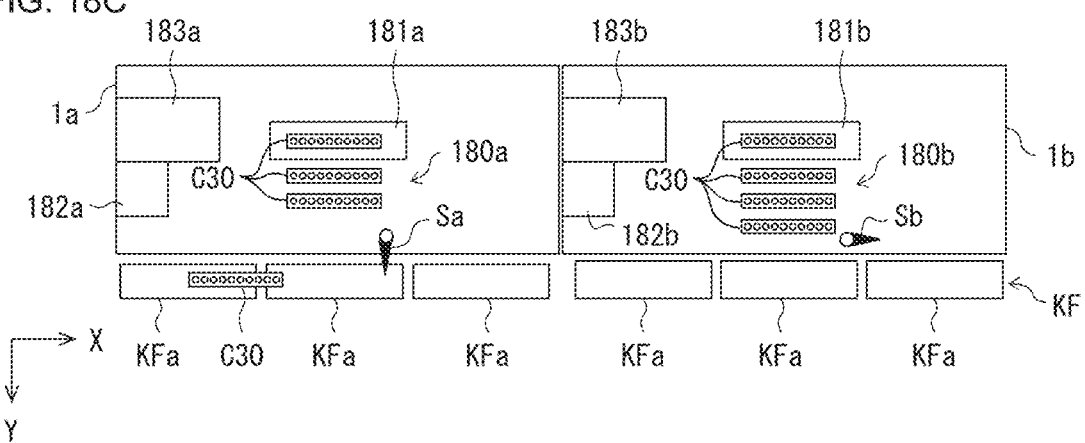

In this section, an operation in which the sample measurement units 1a, 1b take in the sample racks C30 from the sample transport path KF is described by using FIGS. 18A to 18C. FIGS. 18A to 18C are schematic views for explaining an example of the sample transport path KF that transports the sample containers C3 and a mechanism that loads the sample racks C30 from the sample transport path KF in the sample measurement units 1a, 1b. Note that, although the case where short partial transport paths KFa are arranged in a line to form the sample transport path KF is described as an example in FIGS. 18A to 18C, the present invention is not limited to this configuration.

As illustrated in FIGS. 18A to 18C, the sample measurement units 1a, 1b include, respectively, sample rack storage portions 180a, 180b (sample storage portions) that each store the sample racks C30 supplied from the sample transport path KF. Moreover, transfer mechanisms 181a, 181b (lifting-lowering mechanisms) are provided at positions where the sample dispensing arms 111 dispense the samples in the sample measurement units 1a, 1b, respectively. The transfer mechanisms 181a, 181b have a function as partial transport paths KFx. FIG. 18A illustrates a state where the sample rack is transported to the sample measurement unit 1b with a vacancy in the sample rack storage portion 180b. Note that, in order to surely supply the sample rack C30, the sample measurement unit 1b may operate a stopper Sb that stops the sample racks C30 on the sample transport path KF and prevent it from passing by. When there is no vacancy in the sample rack storage portion 180a of the sample measurement unit 1a, a stopper Sa is not operated and the sample rack C30 on the sample transport path KF passes by.

Next, as illustrated in FIGS. 18B and 18C, the sample measurement unit 1b loads the sample rack C30 onto the sample rack storage portion 180b by using the sample transfer path KTb. Like the sample measurement unit 1b, the sample measurement unit 1a also has a mechanism that loads the sample rack C30 from the sample transport path KF onto the sample rack storage portion 180a.

Figure 19:
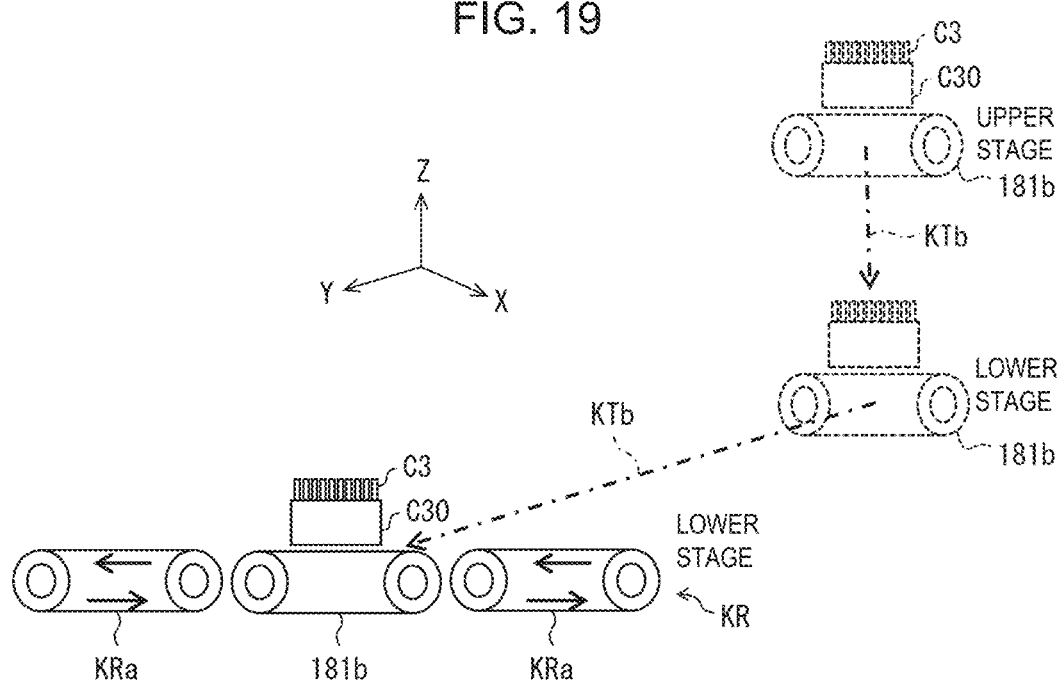
FIG. 19 is a schematic view illustrating a schematic configuration of a consumable collection path.
Figure 21A:
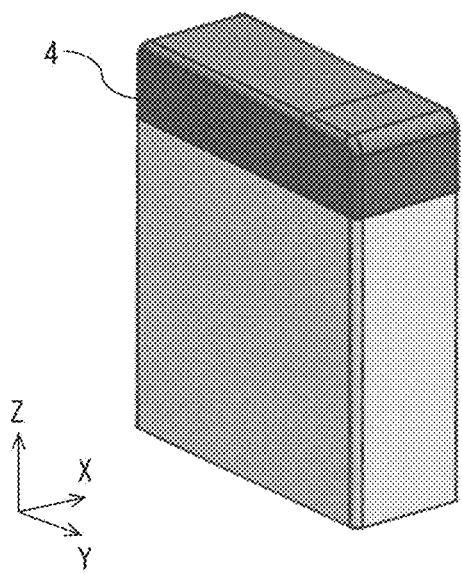
FIGS. 21A to 21D are perspective views illustrating a schematic configuration of a sample setting unit.
Figure 21B:
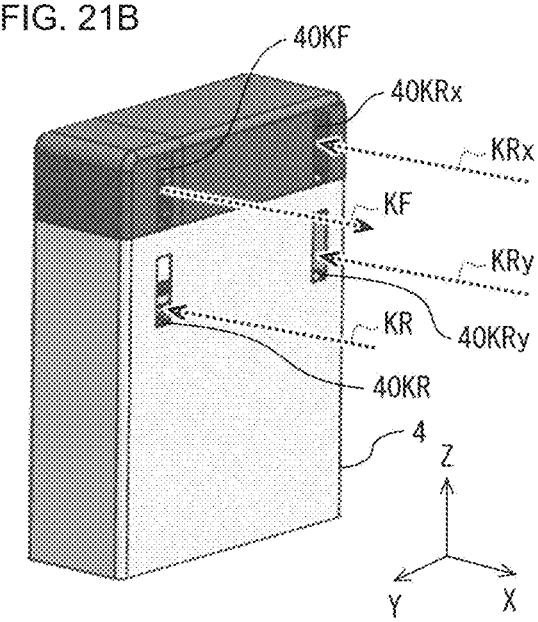
Figure 21C:
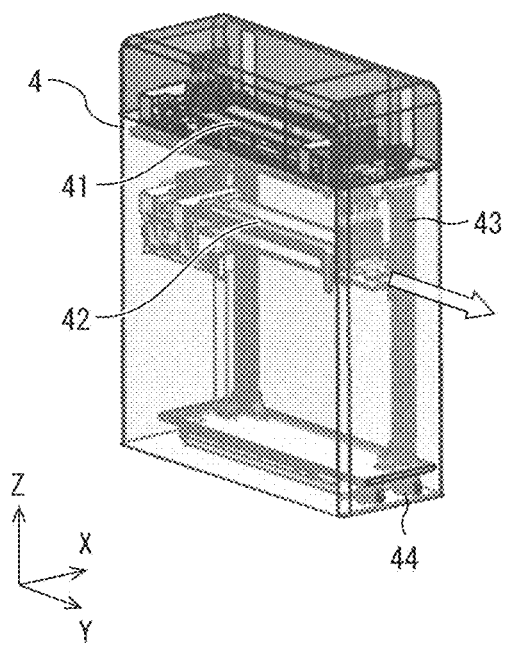
Figure 21D:
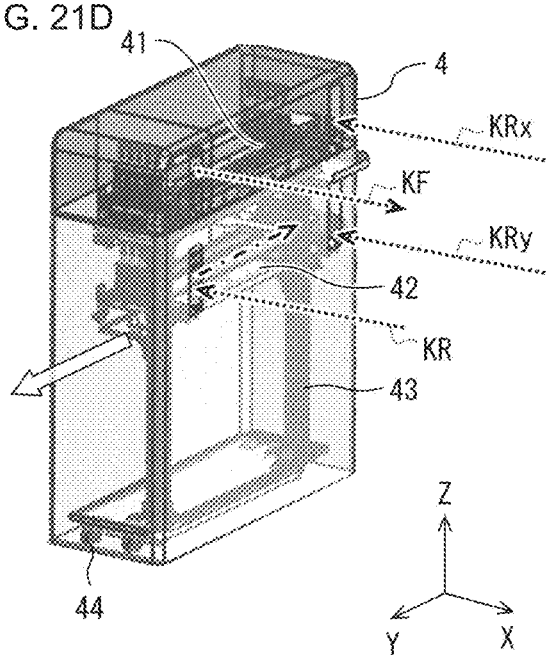

Next, a configuration that transfers the sample rack C30, holding the sample containers C3 containing the samples for which the measurement is completed, from each of the sample measurement units 1a, 1b to the sample collection path KR is described by using FIG. 19. FIG. 19 is a schematic view illustrating an example of the configuration that transfers the sample rack C30 from each of the sample measurement units 1a, 1b to the sample collection path KR. Note that, although the case where short partial transportation paths KRa are arranged in a line to form the sample collection path KR is described as an example in FIG. 19, the present invention is not limited to this configuration.

The sample rack C30 holding the sample containers C3 containing the samples for which the measurement is completed in the case of the sample measurement unit 1b is transferred to the lower stage together with the transfer mechanism 181b by a lifting-lowering mechanism and is then transferred to a position on the sample collection path KR provided below the sample transport path KF. Note that, for example, an elevator type, a slide type, and the like are conceivable as the type of the lifting-lowering mechanism. However, since it not preferable to apply impact to the sample containers C3 in the transfer of the samples, an elevator mechanism that can transfer the sample containers C3 in the height direction while maintaining them horizontal is desirable for the transfer of the sample containers. The transfer mechanism 181b moved along the sample transfer path KTb together with the sample rack C30 replaces the partial transport path KFx forming the sample collection path KR and the transfer of the sample rack C30 to the sample collection path KR is thereby completed. Note that the configuration may be such that the partial transport path KFx replaced by the transfer mechanism 181b is moved in the case of the sample measurement unit 1b to function as the transfer mechanism 181b in the sample measurement unit 1b.

<Consumable Setting Unit 2>

FIGS. 20A to 20D are perspective views illustrating a schematic configuration of the consumable setting unit 2. As illustrated in FIGS. 20A to 20D, opening portions 20KF1, 20KR1 are formed in a left side surface of the consumable setting unit 2. The left side surface of the consumable setting unit 2 is a surface on the side facing the sample sorting unit 3. The sample container or the sample rack C30 transported from the sample setting unit 4 through the sample transport path KF enters the consumable setting unit 2 from the opening portion 20KF1. The sample container or the sample rack C30 used in the sample measurement units 1a, 1b is discharged from the opening portion 20KR1 to the sample collection path KR.

Meanwhile, opening portions 20F2, 20R2, 21F2, 21R2, 20KF2, 20KR2 are formed in a right side surface of the consumable setting unit 2. The right side surface of the consumable setting unit 2 is a surface on the side facing the sample measurement unit 1a. The consumables to be used in the sample measurement units 1a, 1b are discharged from the opening portions 20F2, 21F2 to the first transport paths F. Specifically, the cuvette C1 and the pipet tip C2 to be used in the sample measurement units 1a, 1b are discharged respectively from the opening portions 20F2, 21F2 to the first transport paths F.

The consumables used in the sample measurement units 1a, 1b enter the consumable setting unit 2 from the opening portions 20R2, 21R2 by being transported through the second transport paths R. Specifically, the cuvette C1 and the pipet tip C2 used in the sample measurement units 1a, 1b enter the consumable setting unit 2 respectively from the opening portions 20R2, 21R2 by being transported through the second transport paths R.

The sample container or the sample rack C30 to be used in the sample measurement units 1a, 1b is discharged from the opening portion 20KF2 to the sample transport path KF. The sample rack C30 holding the sample containers C3 containing the samples measured in the sample measurement units 1a, 1b enter the consumable setting unit 2 from opening portion 20KR2 by being transported through the sample collection path KR.

The consumable setting unit 2 is a unit that holds the consumables to be used in the sample measurement units 1a, 1b. The consumable setting unit 2 houses the cuvettes C1 and the pipet tips C2 to be used in the sample measurement units 1a, 1b into the consumable racks C10, C20 and discharges the cuvettes C1 and the pipet tips C2 to the first transport paths F.

The consumable setting unit 2 has the case and, as illustrated in FIGS. 20A to 20D, the inside of the case is divided into multiple levels in the height direction. An upper level portion of the inside of the case is provided with the consumable rack setting part 21 in which the user sets the consumables and the consumable racks C10, C20 for holding the consumables and the consumable rack collector 22 that holds the collected empty consumable racks C10, C20 (that is, holding no consumables).

A window 23 is a window through which the user can see the sample rack C30 transported from the sample setting unit 4 by the sample transport path KF. A window 24 is a window through which the user can see the sample rack C30 transported from the sample measurement units 1a, 1b by the sample collection path KR.

A lower level portion of the inside of the case is provided with the consumable accumulation part 26 and the used reagent container accumulation part 25. The consumable accumulation part 26 is a container in which the consumables that have been used in the sample measurement units 1*a*, 1*b* and become used consumables are collected. The used reagent container accumulation part 25 is a container in which the reagent containers that have become empty by being used in any of the sample measurement units 1*a*, 1*b* are collected.

The consumable accumulation part 26 is configured to be drawn out in the Y-axis positive direction by the user. The user can thereby easily take out and dispose the consumables collected in the consumable accumulation part 26.

A bottom surface of the used reagent container accumulation part 25 is tilted such that the height decreases in the Y-axis positive direction. Since the reagent containers collected in the used reagent container accumulation part 25 moves toward the front surface side along this tilt, the user can easily take out the reagent containers from the used reagent container accumulation part 25.

<Sample Setting Unit 4>

The sample setting unit 4 is a unit that holds the samples to be subjected to the measurement performed in the sample measurement units 1*a*, 1*b*.

FIGS. 21A to 21D are perspective views illustrating a schematic configuration of the sample setting unit 4. As illustrated in FIGS. 21A to 21D, opening portions 40KF, 40KR, 40KRx, 40KRy are formed in a right side surface of the sample setting unit 4. The right side surface of the sample setting unit 4 is a surface on the side facing the sample sorting unit 3. The sample container or the sample rack C30 to be used in the sample measurement units 1*a*, 1*b* is discharged from the opening portion 40KF to the sample transport path KF. The sample rack C30 holding the sample containers C3 containing the samples measured in the sample measurement units 1*a*, 1*b* enter the sample setting unit 4 from the opening portion 40KR by being transported through the sample collection path KR.

The sample container C3 or the sample rack C3 sorted as "remeasurement sample" in the sample sorting unit 3 enters the sample setting unit 4 from the opening portion 40KRx by being transported through a remeasurement sample transport path KRx. The sample rack C30 sorted as "measured sample" in the sample sorting unit 3 enters the sample setting unit 4 from the opening portion 40KRy by being transported through a measured sample transport path KRy.

Figure 22:
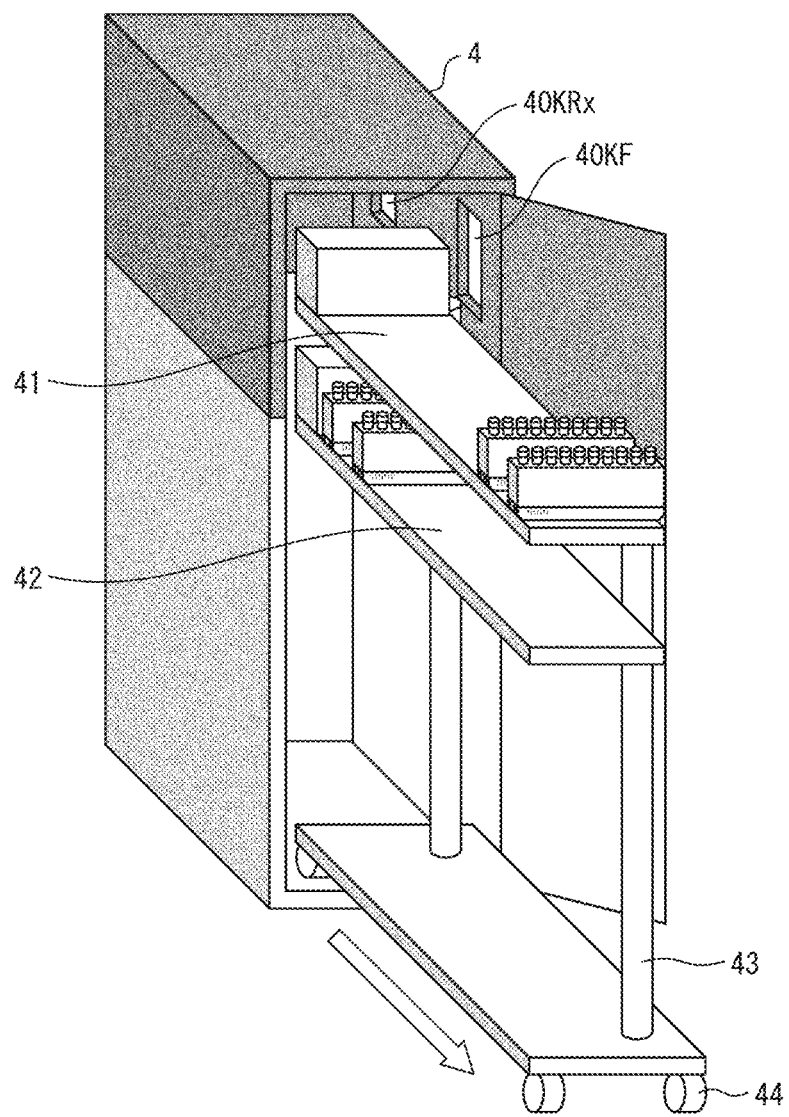
FIG. 22 is a perspective view illustrating a schematic configuration of a sample setting unit.
Figure 23A:
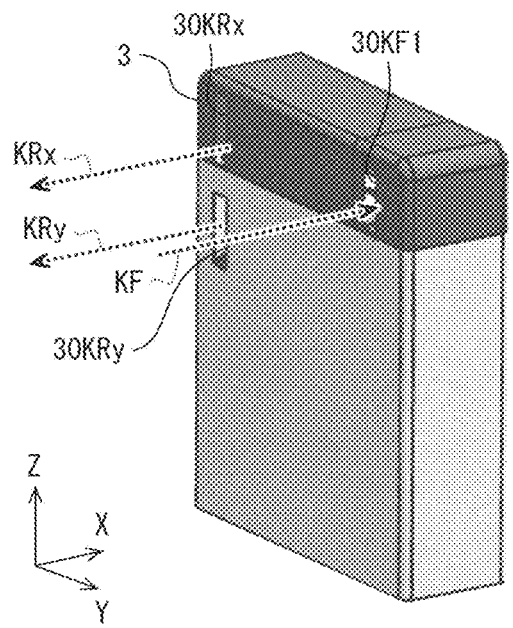
FIGS. 23A to 23D are perspective views illustrating a schematic configuration of a sample sorting unit.
Figure 23B:
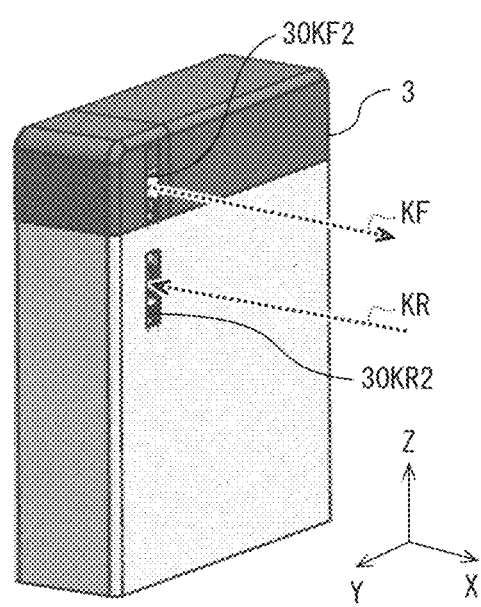
Figure 23C:
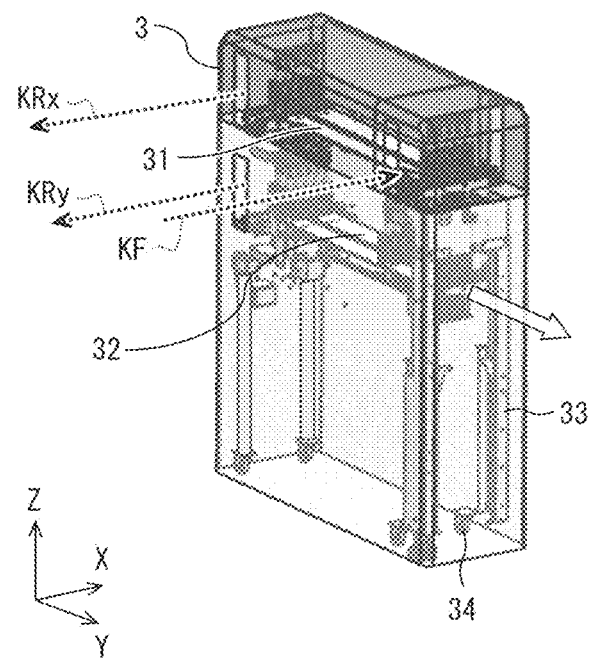
Figure 23D:
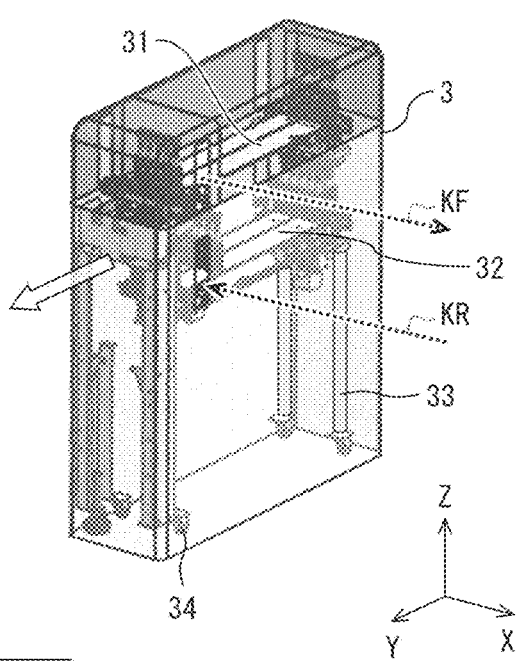
Figure 25A:
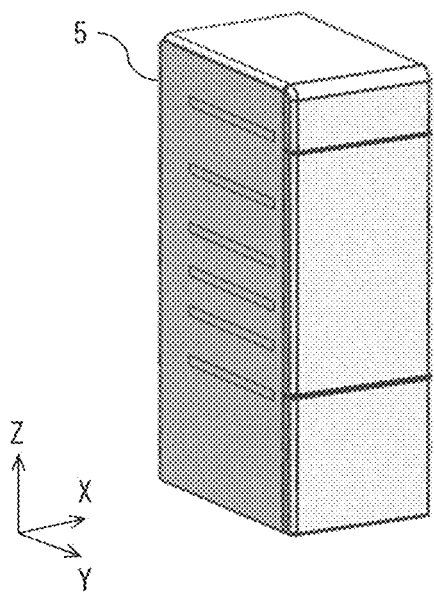
FIGS. 25A to 25D are perspective views illustrating a schematic configuration of a reagent container holding unit.
Figure 25B:
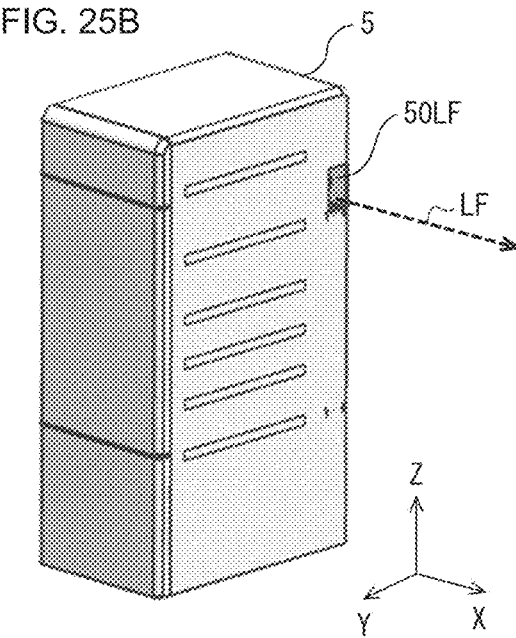
Figure 25C:
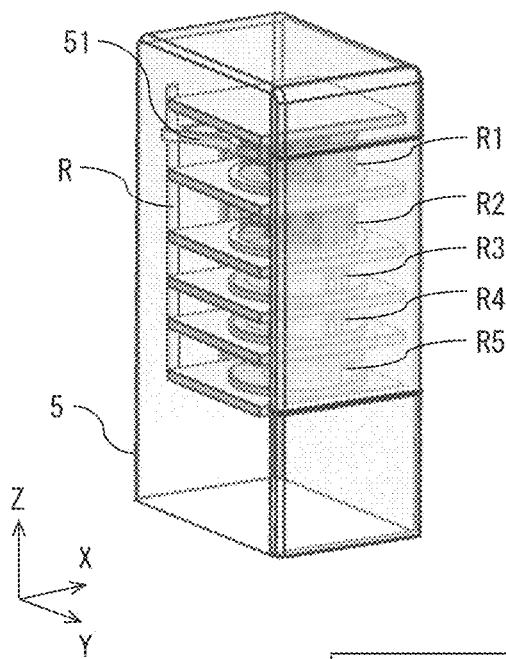
Figure 25D:
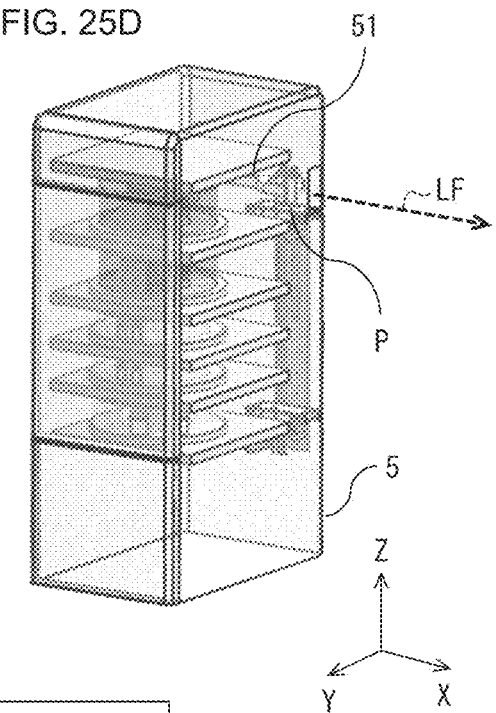

Moreover, as illustrated in FIG. 22, the sample setting unit 4 includes a cart 43 that holds the sample racks C30. The cart 43 is housed inside the sample setting unit 4. The cart 43 has casters 44 and is easily pulled out from the case of the sample setting unit 4. An upper stage of the cart 43 is the sample rack setting part 41 and a lower stage is the sample rack collector 42. The laboratory technician or the like who uses the sample measurement system 100 can pull out the cart 43 from the sample setting unit and easily perform works such as placing the sample rack C30 housing the samples to be processed on the upper stage of the cart 43 and taking out the sample containers C3 containing the measured samples from the lower stage of the cart 43.

<Sample Sorting Unit 3>

The sample sorting unit 3 is a functional unit that has a function of sorting the samples after the measurement based on results of processing in the sample measurement units 1*a*, 1*b*.

FIGS. 23A to 23D are perspective views illustrating a schematic configuration of the sample sorting unit 3. As illustrated in FIGS. 23A to 23D, opening portion 30KF1, 30KRx, 30KRy are formed in a left side surface of the sample sorting unit 3. The left side surface of the sample sorting unit 3 is a surface on the side facing the sample setting unit 4. The sample container or the sample rack C30 transported from the sample setting unit 4 through the sample transport path KF enters the sample sorting unit 3 from the opening portion 30KF1. The sample container or the sample rack C30 determined to be "remeasurement sample" or "retest required sample" by the sample sorting unit 3 is discharged from the opening portion 30KRx to the remeasurement sample transport path KRx. The sample container or the sample rack C30 determined to be "measured sample" by the sample sorting unit 3 is discharged from the opening portion 40KRy to the measured sample transport path KRy.

Meanwhile, openings 30KF2, 30KR2 are formed in a right side surface of the sample sorting unit 3. The right side surface of the sample sorting unit 3 is a surface on the side facing the consumable setting unit 2. The sample container or the sample rack C30 to be used in the sample measurement units 1*a*, 1*b* are discharged from the opening portion 30KF2 to the sample transport path KF. The sample rack C30 holding the sample containers C3 containing the samples measured in the sample measurement units 1*a*, 1*b* enters the sample sorting unit 3 from the opening portion 30KR2 by being transported through the sample collection path KR.

Next, a method of sorting the samples performed by the sample sorting unit 3 is described by using FIG. 24. The sample sorting unit 3 sorts the samples into "measured samples," "remeasurement samples," and "retest required samples" according to instructions from the information management device 7. The information management device 7 obtains a measurement result for each sample from the sample measurement units 1*a*, 1*b* and determines which one of "measured samples," "remeasurement samples," and "retest required samples" the sample is to be sorted as based on comparison between the measurement result and a predetermined sorting criterion. Note that the configuration may be such that, instead of the information management device 7, the sample sorting unit 3 performs the determination of sorting of the sample racks C30.

For example, the sample sorting unit 3 sorts the sample rack C30, holding only the sample containers C3 containing the samples for which the measurement is normally completed, as "measured samples." The sample rack C30 sorted as the "measured samples" is transported from the measured sample transport path KRy to the sample setting unit 4.

For example, when the sample rack C30 holds at least one sample container containing a sample whose measurement value deviates from a normal value by a predetermined criterion range or more, the sample sorting unit 3 sorts this sample rack C30 as "remeasurement samples." The sample rack C30 sorted as "remeasurement samples" is transported from the remeasurement sample transport path KRx to the sample setting unit 4 and then transported from the sample setting unit 4 to the sample measurement units 1*a*, 1*b* again.

For example, the sample sorting unit 3 sorts the sample rack C30 satisfying the following conditions (1) and (2) as "retest required samples." The sample rack C30 sorted as "retest required samples" is transferred from a sorter 32 to a retest required sample storage part 31 of the sample sorting unit. The sample rack C30 transferred to the retest required sample storage part 31 is held in the retest required sample storage part 31 until being taken out by the user such as the laboratory technician.

Like the sample setting unit 4, the sample sorting unit 3 also includes a cart 33 that holds the sample racks C30. The cart 33 is housed inside the sample sorting unit 3. The cart 33 includes casters 34 and is easily pulled out from the case of the sample sorting unit 3. The user can thereby easily take out the sample racks C30 stored in the retest required sample storage part 31.

(1) The degree of deviation of the measurement value from the normal value is less than the predetermined criterion range.

(2) The sample rack C30 holds at least one sample for which obtaining of a sample from a subject again is desirable or for which check work by the laboratory technician is to be requested.

For example, when chyle is found in the sample, a measurement value relating to an immune system test may be affected. For the sample in which chyle is recognized, it is necessary to obtain a sample from the subject again or to perform measurement right after the sample is centrifuged to surely separate the chyle in the sample from plasma. Such samples and the like fall into the category of "retest required samples" described above.

Note that the number of functional units included in the sample measurement system 100 is not limited to that in the example illustrated in FIG. 1. For example, the number of sample setting units 4 and the number of sample sorting units 3 may each be one or two or more. However, it is desirable that the number of the sample setting units 4 and the number of sample sorting units 3 are determined such that there is no difference between the total number of samples that can be held by the sample setting units 4 and that by the sample sorting units 3. When the number of samples that can be held by each sample setting unit 4 is equal to the number of samples that can be held by each sample sorting unit 3, the numbers of the respective types of units included in the sample measurement system 100 are desirably the same.

<Reagent Container Holding Unit 5>

The reagent container holding unit 5 is a functional unit that holds the reagent containers containing the reagents to be used in the measurement by the sample measurement units 1a, 1b. A configuration of the reagent container holding unit 5 is described by using FIGS. 25A to 25D. FIGS. 25A to 25D are perspective views illustrating a schematic configuration of the reagent container holding unit 5.

As illustrated in FIGS. 25A to 25D, an opening portion 50LF for the container transport path LF that transports the reagent containers is provided in a left side surface of the reagent container holding unit 5.

<<Transport of Reagent Containers, Collection of Used Reagent Containers>>

The information management device 7 sends the reagent container holding unit 5 information (for example, the aforementioned reagent IDs) on the reagent containers to be supplied to the sample measurement units 1a, 1b and the reagent container holding unit 5 takes out the reagent containers to which the target reagent IDs are assigned and transfers them to the container transport path LF.

The reagent containers taken out by the reagent container holding unit 5 are transported from the reagent container holding unit 5 to the sample measurement units 1a, 1b through the container transport path LF that is a transport path dedicated to reagent containers.

The information management device 7 sends the sample measurement units 1a, 1b information (for example, the aforementioned reagent IDs) on the reagent containers to be collected. The sample measurement units 1a, 1b determines the reagent containers to be collected based on the reagent IDs, takes out the reagent containers and transfers the reagent containers to predetermined positions. In this case, the reagent containers to be collected are reagent containers emptied in the sample measurement units 1a, 1b, the reagent containers containing expired reagents, and the like.

When the reagents R1 to R5 are reagents that require refrigeration storage, the reagent container holding unit 5 has a function as a cooling box and the reagents R1 to R5 in the reagent containers held in the case of the reagent container holding unit 5 are maintained at predetermined temperature. For example, the reagent container holding unit 5 holds the reagent containers containing the reagent R1 to R5 at 2 to 8° C. Note that, when the reagent containers are to be discharged from the reagent container holding unit 5 to the sample measurement units 1a, 1b, the reagent containers are exposed to room temperature in the transport. In consideration of this, the temperature at which the reagent container holding unit 5 holds the reagent containers is desirably set to lower temperature. Alternatively, the reagent containers containing the reagents R1 to R5 may be manufactured by using a material less likely to be affected by temperature of outside air.

Figure 26:
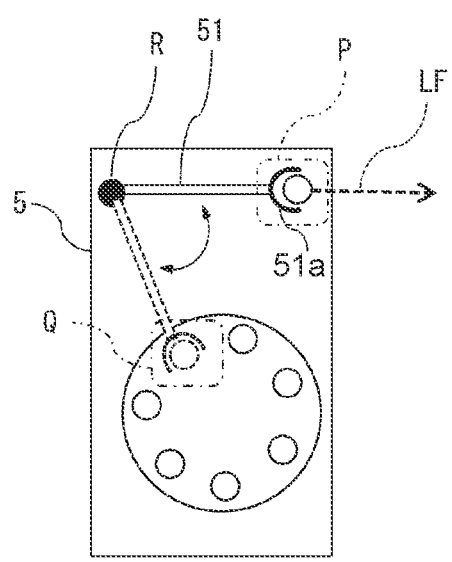
FIG. 26 is a view illustrating an example of a mechanism that transfers the reagent containers to the transport path in a reagent container holding unit.

FIG. 26 is a view for explaining an example of a mechanism that transfers the reagent containers to the container transport path LF in the reagent container holding unit 5.

The reagent container holding unit 5 includes a reagent container shelf on which the reagent containers of the respective reagents are arranged, a clamp-equipped arm 51a for gripping and moving each reagent container on the reagent container shelf to place the reagent container at a predetermined position, and a rail R for moving the clamp-equipped arm 51a.

The clamp-equipped arm 51a can move upward and downward along the rail R to grip the reagent container placed at a position Q on each reagent container shelf and transfer the reagent container to a position P. The reagent container transferred to the position P is transported to the sample measurement units 1a, 1b through the container transport path LF.

<Cleaning Liquid Holding Unit 6>

The sample measurement system 100 may have a function of automatically cleaning flow paths, nozzles, and the like in the sample measurement units 1a, 1b through which the reagents R1 to R5 flow. In this case, the sample measurement system 100 may include the cleaning liquid holding unit 6 in addition to the aforementioned units. The cleaning liquid holding unit 6 is functional unit that holds a cleaning liquid used to clean the flow paths in the sample measurement units 1a, 1b.

Figure 27A:
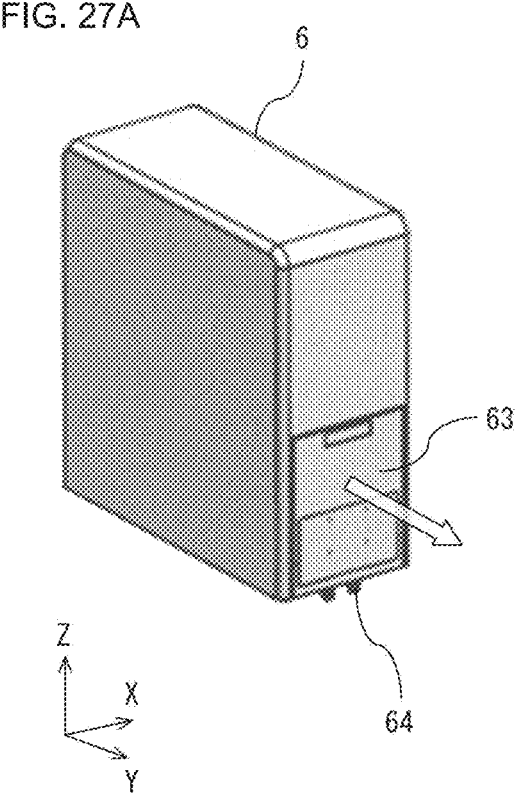
FIGS. 27A and 27B are perspective views illustrating a schematic configuration of a cleaning liquid holding unit.
Figure 27B:
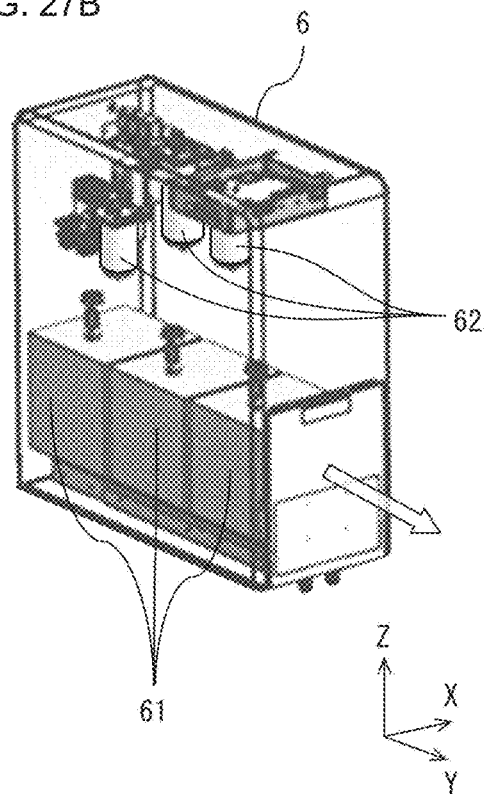
Figure 28:
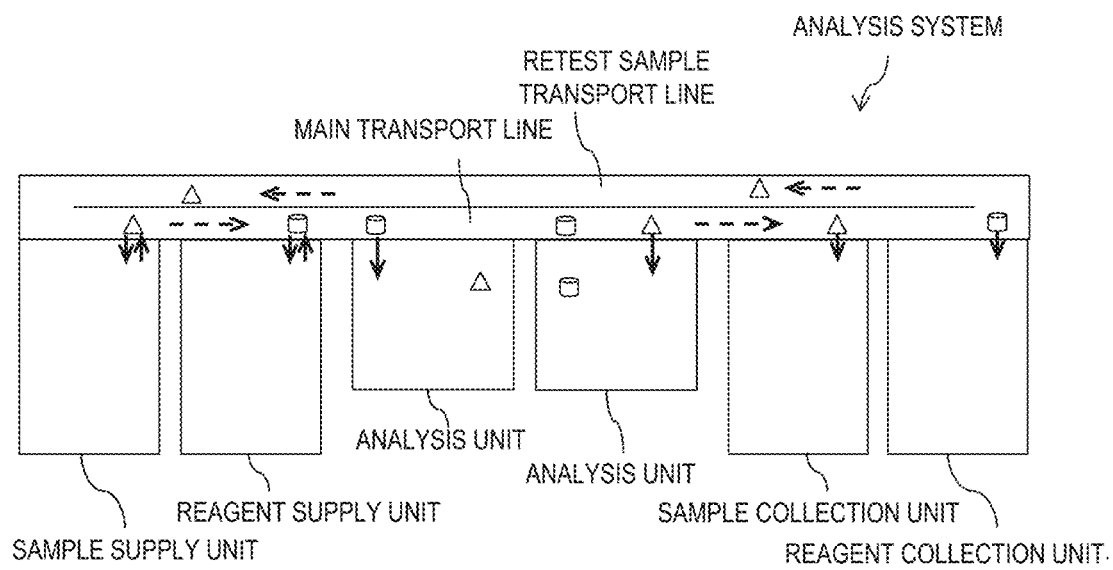
FIG. 28 is a diagram illustrating a configuration of a conventional analysis system that automatically supplies reagents to analysis units by using a transport line that transports samples.

In this section, a configuration of the cleaning liquid holding unit 6 is described by using FIGS. 27A and 27B. FIGS. 27A and 27B are perspective views illustrating a schematic configuration of the cleaning liquid holding unit 6. The cleaning liquid holding unit 6 holds cleaning liquid containers 61 that contain the cleaning liquid and cleaning liquid pumps 62 that aspirate the cleaning liquid from the cleaning liquid containers 61. Cleaning liquid supply flow paths (not illustrated) that allow the cleaning liquid to be supplied to predetermined flow paths, nozzles, and the like in the sample measurement units 1a, 1b are provided between the cleaning liquid holding unit 6 and the sample measurement units 1a, 1b.

The cleaning liquid holding unit 6 also includes a cart 63 in which the cleaning liquid containers 61 are placed. The cart 63 is housed inside the cleaning liquid holding unit 6. The cart 63 includes casters 64 and is easily pulled out from the case of the cleaning liquid holding unit 6. The user can thereby easily place the cleaning liquid containers 61 in the cleaning liquid holding unit 6.

Opening-closing valves (not illustrated) are provided in the cleaning liquid flow paths. The information management device 7 can control the opening-closing valves together with the cleaning liquid pumps 62. When the sample measurement system 100 has such a configuration, for example, the information management device 7 manages information such as cleaning liquid remaining amounts in the cleaning liquid containers held in the cleaning liquid holding unit 6 and the number of times cleaning processing is performed in each of the sample measurement units 1*a*, 1*b*.

While the measurement is performed in the sample measurement units 1*a*, 1*b*, the information management device 7 maintains a closed state to prevent the cleaning liquid from flowing into the sample measurement units 1*a*, 1*b*. For example, when the sample measurement unit 1*a* completes the measurement for all samples or when the sample measurement unit 1*a* completes the measurement a predetermined number of times, the information management device 7 may switch the valve provided in the cleaning liquid supply flow paths to the sample measurement unit 1*a* to an open state and cause the cleaning liquid pump to operate. The cleaning liquid is thereby automatically delivered to the predetermined flow path and the nozzle when the sample measurement unit 1*a* completes the measurement for all samples or when the sample measurement unit 1*a* completes the measurement a predetermined number of times, and smearing and clogging of the flow path can be thus prevented.

Note that, when the volume of the cleaning liquid contained in the cleaning liquid containers held in the cleaning liquid holding unit 6 is large enough to perform the processing a predetermined number of times, the information management device 7 may manage information indicating the number of times the cleaning is performed in the sample measurement units 1*a*, 1*b* since the cleaning liquid containers 61 are housed in the cleaning liquid holding unit 6.

Note that the information management device 7 and the controllers of the respective functional units in the sample measurement system 100 may be implemented by software or a logical circuit (hardware) formed in an integral circuit (IC chip) or the like.

In the latter case, the information management device 7 and the controllers of the respective functional units in the sample measurement system 100 include a computer configured to execute commands of a program that is software for implementing the functions. The computer includes, for example, one or more processors and a computer-readable storage medium storing the aforementioned program. Then, in the aforementioned computer, the aforementioned processor reads the aforementioned program from the aforementioned storage medium and executes the program to achieve an object of the present invention. For example, a CPU (Central Processing Unit) can be used as the aforementioned processor. A "non-temporary tangible medium," for example, a ROM (Read Only Memory) as well as a tape, a disc, a card, a semiconductor memory, a programmable logical circuit, and the like can be used as the aforementioned storage medium. Moreover, the computer may further include units such as a RAM (Random Access Memory) for developing the aforementioned program. Furthermore, the aforementioned program may be supplied to the aforementioned computer via any transmission medium (communication network, broadcast wave, or the like) that can transmit the program. Note that one aspect of the present invention may also be implemented in a form of data signals embedded in a carrier wave in which the aforementioned program is implemented by electronic transmission.

Embodiment 2

Another embodiment of the present invention is described below. Note that, for the sake of description, members having the same functions as the members described in the aforementioned embodiment are denoted by the same reference signs and description thereof is not repeated.

The sample measurement units 1*a*, 1*b* cannot perform the measurement of the samples when the sample measurement units 1*a*, 1*b* run out of any of the consumables, samples, and reagents. For example, when failure occurs in any of the first transport paths F, the second transport path KF, the reagent container transport path LF, and the like included in the sample measurement system 100, the supply of consumables, samples, and reagents to the sample measurement units 1*a*, 1*b* stops. In this case, the measurement of the samples in the sample measurement system 100 stops until the failure in the first transport paths F, the sample transport path KF, the reagent container transport path LF, or the like is solved.

The number of sample processes performed in hospitals and test institutions are increasing in recent years and the hospitals and test institutions are likely to introduce the sample measurement system 100 with many (for example, five or ten) sample measurement units. However, increasing the number of sample measurement units increases the length of the first transport paths F, the sample transport path KF, and the reagent container transport path LF. Accordingly, frequency of a failure occurring in the first transport paths F, the sample transport path KF, and the reagent container transport path LF may increase.

Thus, the sample measurement system 100 desirably has such a configuration that, even when the supply of consumables, samples, and reagents from these transport paths to the sample measurement units 1*a*, 1*b* stops, the measurement does not have to be immediately stopped and can continue.

(Case Where Supply of Consumable Racks C10, C20 from First Transport Paths F to Sample Measurement Units 1*a*, 1*b* Stops)

The sample measurement units 1*a*, 1*b* include, respectively, consumable rack storage portions 182*a*, 182*b* (see FIGS. 18A to 18C) that store the consumable racks C10, C20 supplied from the first transfer paths F, and each include the cuvette supplier 101, the pipet tip supplier 102 (see FIG. 11), and the urgent sample-tip transporter 20*h* that receive the supply of consumables from paths different from the first transport paths F.

When the supply of consumables from the first transport paths F stops during the measurement of the samples in the sample measurement units 1*a*, 1*b*, the sample measurement units 1*a*, 1*b* can continue the measurement of the samples by using the consumables held in the consumable racks C10, C20 stored in the consumable rack storage portions 182*a*, 182*b* and the consumables supplied to the cuvette suppliers 101 and the pipet tip suppliers 102.

The sample measurement system 100 can thereby continue the processing without immediately stopping the measurement even when the supply of the consumables from the first transfer paths F to the sample measurement units 1*a*, 1*b* stops. Accordingly, the measurement of the samples can continue in the state where no consumables are supplied from the consumable setting unit 2 and the downtime can be reduced.

(Case Where Supply of Sample Containers from Second Transport Path KF to Sample Measurement Units 1*a*, 1*b* Stops)

As illustrated in FIGS. 18A to 18C, the sample measurement units 1*a*, 1*b* include, respectively, the sample rack storage portions 180*a* and 180*b* that store the sample racks C30 holding the samples from the sample transport path KF and sample holding portions 183*a*, 183*b* that hold the samples from paths different from the sample transport path KF. For example, the case where the laboratory technician or the like who uses the sample measurement system 100 manually sets the sample racks C30 directly into the sample measurement units 1*a*, 1*b* can be given as the paths different from the sample transport path KF.

When the supply of samples from the sample transport path KF stops during the measurement of the samples in the sample measurement units 1*a*, 1*b*, the sample measurement units 1*a*, 1*b* may continue the measurement of the samples by using the samples stored in the sample rack storage portions 180*a* and 180*b* and the samples held in the sample holding portions 183*a*, 183*b*.

The sample measurement system 100 can thereby continue the measurement of the samples without immediately stopping the measurement even when the supply of samples from the sample transport path KF to the sample measurement units 1*a*, 1*b* stops. Accordingly, the measurement can continue in the state where no samples are supplied from the sample setting unit 4 and the downtime can be reduced.

(Case Where Supply of Reagent Containers from Second Transport Path LF to Sample Measurement Units 1*a*, 1*b* Stops)

Sample Measurement Units 1*a*, 1*b* are configured to store multiple reagent containers of each of the reagents R1 to R5 in its case.

When the supply of reagent containers from the container transport path LF stops during the measurement of the samples in the sample measurement units 1*a*, 1*b*, the sample measurement units 1*a*, 1*b* may continue the measurement of the samples by using the reagent containers of the reagents R1 to R5 stored in the case.

The sample measurement system 100 can continue the measurement of the samples without immediately stopping the measurement even when the supply of reagent containers from the container transport path LF to the sample measurement units 1*a*, 1*b* stops. Accordingly, the measurement of the samples can continue in the state where no reagent containers are supplied from the reagent container holding unit 5 and the downtime can be reduced.

The present invention is not limited to the embodiments described above and various changes can be made within a scope described in the claims. Embodiments obtained by appropriately combining technical means disclosed in different embodiments are also included in the technical scope of the present invention.

1*a*, 1*b* sample measurement unit
2 consumable setting unit (setting part, rack setting unit)
3 sample sorting unit
4 sample setting unit (rack setting unit)
5 reagent container holding unit
6 cleaning liquid holding unit
7 information management device
21 consumable rack setting part (setting part)
22 consumable rack collector (collector)
26 consumable accumulation part
41 sample rack setting part
42 sample rack collector
101 cuvette supplier
102 pipet tip supplier
180*a*, 180*b* sample rack storage portion
181*a*, 181*b* transfer mechanism (lifting-lowering mechanism)
182*a*, 182*b* consumable rack storage portion (consumable storage portion)
C1 cuvette
C2 pipet tip
C3 sample container
C10, C20 consumable rack
C30 sample rack
F first transport path
R second transport path (empty rack transport path)
KF sample transport path
KR sample collection path (sample rack collection path)
LF reagent container transport path
LR used reagent container transport path
RR consumable collection path
Ta, Tb consumable transfer path
KTa, KTb sample transfer path
LTa, LTb reagent container transfer path

The invention claimed is:

1. A sample measurement system comprising:
sample measurement units that perform measurement on samples by using consumables;
a setting part in which consumable racks housing the consumables are set;
a first transport path that extends in a horizontal direction from the setting part to one of the sample measurement units and supplies the consumable racks set in the setting part to the one of the sample measurement units;
a collector that is arranged adjacent to the setting part and that collects empty racks that are emptied after being transported to at least one of the sample measurement units; and
a second transport path that extends in the horizontal direction from the one of the sample measurement units to the collector and transports the empty racks to the collector, wherein the second transport path is parallel to the first transport path.

2. The sample measurement system according to claim 1, wherein the first transport path and the second transport path are provided in cases of the sample measurement units.

3. The sample measurement system according to claim 2, further comprising a consumable collection path that collects the consumables, used after being transported to at least one of the sample measurement units, into the setting part.

4. The sample measurement system according to claim 3, wherein the setting part comprises a consumable accumulation part in which the consumables transported by using the consumable collection path are accumulated.

5. The sample measurement system according to claim 3, wherein
the sample measurement units comprise consumable storage portions that store the consumables supplied from the first transport path, and
in response to supplying of the consumables from the first transport path to the sample measurement units stops, the sample measurement units perform measurement on the samples by using the consumables stored in the consumable storage portions.

6. The sample measurement system according to claim 3, further comprising an information management device that comprises a computer and is communicably connected to each of the setting part and the sample measurement units and that manages a supply state of the consumables from the first transport path to each of the sample measurement units, wherein
  In response to the consumables being not supplied from the setting part to at least one of the sample measurement units, the information management device causes the consumable racks to be supplied to the sample measurement unit to which the consumables are not supplied.

7. The sample measurement system according to claim 6, wherein the information management device gives a transport instruction to the setting part such that the consumables are supplied to each of the sample measurement units.

8. The sample measurement system according to claim 7, wherein
  rack identification information is assigned to each of the consumable racks,
  the setting part sends the information management device the rack identification information of the consumable rack transported to the first transport path in response to the transport instruction, and
  the information management device determines whether the consumable rack to which the received rack identification information is assigned is supplied to the sample measurement unit.

9. The sample measurement system according to claim 2, wherein the consumables are disposable parts.

10. The sample measurement system according to claim 2, wherein the consumables are any of pipet tips, cuvettes, reagent containers, petri dishes, well plates, glass slides, glass substrates, and syringe needles.

11. The sample measurement system according to claim 1, further comprising a consumable collection path that collects the consumables, used after being transported to at least one of the sample measurement units, into the setting part.

12. The sample measurement system according to claim 11, wherein the setting part comprises a consumable accumulation part in which the consumables transported by using the consumable collection path are accumulated.

13. The sample measurement system according to claim 1, wherein
  the sample measurement units comprise consumable storage portions that store the consumables supplied from the first transport path, and
  in response to supplying of the consumables from the first transport path to the sample measurement units stops, the sample measurement units perform measurement on the samples by using the consumables stored in the consumable storage portions.

14. The sample measurement system according to claim 1, further comprising an information management device that comprises a computer and is communicably connected to each of the setting part and the sample measurement units and that manages a supply state of the consumables from the first transport path to each of the sample measurement units, wherein
  in response to the consumables being not supplied from the setting part to at least one of the sample measurement units, the information management device causes the consumable racks to be supplied to the sample measurement unit to which the consumables are not supplied.

15. The sample measurement system according to claim 14, wherein the information management device gives a transport instruction to the setting part such that the consumables are supplied to each of the sample measurement units.

16. The sample measurement system according to claim 15, wherein
  rack identification information is assigned to each of the consumable racks,
  the setting part sends the information management device the rack identification information of the consumable rack transported to the first transport path in response to the transport instruction, and
  the information management device determines whether the consumable rack to which the received rack identification information is assigned is supplied to the sample measurement unit.

17. The sample measurement system according to claim 1, wherein the consumables are disposable parts.

18. The sample measurement system according to claim 1, wherein the consumables are any of pipet tips, cuvettes, reagent containers, petri dishes, well plates, glass slides, glass substrates, and syringe needles.

19. A method of transporting racks in which consumable racks housing consumables are supplied to sample measurement units that perform measurement on samples by using the consumables and in which empty racks that are emptied after being transported to at least one of the sample measurement units are collected from the sample measurement unit; the method comprising:
  supplying the consumable racks housing the consumables from a setting part to one of the sample measurement units through a first transport path that extends in a horizontal direction from the setting part to one of the sample measurement units, the setting part being a part in which the consumable racks are set;
  collecting the empty racks that are emptied after being transported to at least one of the sample measurement units into a collector arranged adjacent to the setting part; and
  transporting the empty racks to the collector through a second transport path that extends in the horizontal direction from the one of the sample measurement units to the collector, wherein the second transport path is parallel to the first transport path.

* * * * *